(12) United States Patent
Anno

(10) Patent No.: US 11,669,283 B2
(45) Date of Patent: Jun. 6, 2023

(54) INFORMATION PROCESSING SYSTEM, INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Makoto Anno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/583,408

(22) Filed: Jan. 25, 2022

(65) Prior Publication Data

US 2022/0244893 A1   Aug. 4, 2022

(30) Foreign Application Priority Data

Feb. 4, 2021 (JP) .............................. JP2021-016888

(51) Int. Cl.
*G06F 3/12* (2006.01)
*G06K 7/14* (2006.01)

(52) U.S. Cl.
CPC .......... *G06F 3/1208* (2013.01); *G06F 3/1253* (2013.01); *G06F 3/1259* (2013.01); *G06K 7/1413* (2013.01); *G06K 7/1417* (2013.01)

(58) Field of Classification Search
CPC .... G06F 3/1208; G06F 3/1253; G06F 3/1259; G06F 3/1285; G06K 7/1413; G06K 7/1417; Y02P 90/02; Y02P 90/30

USPC ......................................................... 358/1.15
See application file for complete search history.

(56) References Cited

U.S. PATENT DOCUMENTS

| 2011/0026081 | A1* | 2/2011 | Hamada | G06T 11/00 |
| | | | | 358/1.18 |
| 2020/0293241 | A1* | 9/2020 | Hayashi | G06F 3/1257 |
| 2020/0358911 | A1* | 11/2020 | Kikuchi | G06F 3/1208 |

FOREIGN PATENT DOCUMENTS

JP   H07-105300 A   4/1995

* cited by examiner

*Primary Examiner* — Darryl V Dottin
(74) *Attorney, Agent, or Firm* — Venable LLP

(57) ABSTRACT

An information processing system performs processing of a print job including a quality requirement of a quality verification of a print product and inputs verification result data created in a verifier, searches a correspondence table corresponding to the verifier that created the verification result data in which each parameter of a description document and an element of the input verification result data are associated, and using the searched correspondence table, converts a value of each element of the input verification result data to a value of a corresponding parameter of the description document. A description document of the predetermined format including the converted value of each parameter is generated.

16 Claims, 23 Drawing Sheets

FIG. 4A

PQX OF ONE-DIMENSIONAL BARCODE

```
401a—<PQX>
    402a—<SampleColection>
        403a—<Sample>
            404—<ColorReport>...</ColorReport>
            405—<RegistrationReport>...</RegistrationReport>
            406—<DefectReport>...</DefectReport>
            407a—<BarcodeReport>
                421a—<VerificationSet>
                    422—<CustomerItemIdLink>...</CustomerItemIdLink>
                    423—<PositionOnSample>...</PositionOnSample>
                    424a—<Barcode1DEntry>
                        425—<BarcodeSymbology>...</BarcodeSymbology>
                        426—<ReporterIdLink>...</ReporterIdLink>
                        427—<Codewords>...</Codewords>
                        428a—<ISO1DVerification>
                            431—<OverallSymbolGrade>Num</OverallSymbolGrade>
                            432—<MinimumReflectance>Num</MinimumReflectance>
                            433—<SymbolContrast>Num</SymbolContrast>
                            434—<MinimumEdgeContrast>Num</MinimumEdgeContrast>
                            435—<Modulation>Num</Modulation>
                            436—<BarcodeDefects>Num</BarcodeDefects>
                            437—<Decodability>Num</Decodability>
                            438—<Decode>Txt</Decode>
                        428b—</ISO1DVerification>
                    424b—</Barcode1DEntry>
                421b—</VerificationSet>
            407b—</BarcodeReport>
        403b—<Sample>
    402b—</SampleColection>
401b—</PQX>
```

FIG. 4B
PQX OF TWO-DIMENSIONAL BARCODE

```
401a —<PQX>
  402a —<SampleCollection>
    403a —<Sample>
      404 —<ColorReport>...</ColorReport>
      405 —<RegistrationReport>...</RegistrationReport>
      406 —<DefectReport>...</DefectReport>
      407a —<BarcodeReport>
        421a —<VerificationSet>
          422 —<CustomerItemIdLink>
          423 —<PositionOnSample>
          424a —<Barcode2DEntry>
            425 —<BarcodeSymbology>...</BarcodeSymbology>
            426 —<ReporterIdLink>...</ReporterIdLink>
            427 —<Codewords>...</Codewords>
            428a —<ISO2DVerification>
              431 —<OverallSymbolGrade>Num</OverallSymbolGrade>
              432 —<MinimumReflectance>Num</MinimumReflectance>
              433 —<SymbolContrast>Num</SymbolContrast>
              434 —<MinimumEdgeContrast>Num</MinimumEdgeContrast>
              435 —<Modulation>Num</Modulation>
              436 —<BarcodeDefects>Num</BarcodeDefects>
              437 —<Decodability>Num</Decodability>
              438 —<Decode>Num</Decode>
              439 —<UnusedErrorCorrection>Num</UnusedErrorCorrection>
              440 —<CodewordYield>Num</CodewordYield>
              441 —<GridNonuniformity>Num</GridNonuniformity>
              442 —<AxialNonuniformity>Num</AxialNonuniformity>
              443 —<FixedPatternDamage>Num</FixedPatternDamage>
            428b —</ISO2DVerification>
            429 —<FPDDetails>...</FPDDetails>
          424b —</Barcode2DEntry>
        421b —</VerificationSet>
      407b —</BarcodeReport>
    403b —</Sample>
  402b —</SampleCollection>
401b —</PQX>
```

FIG. 5BA

BARCODE VERIFICATION

NO CORRESPONDENCE.
CREATE CORRESPONDENCE?

[ CANCEL ]  [ NEXT ]
  592         593

FIG. 5BB

BARCODE VERIFICATION

PROCEED WITH CORRESPONDENCE TABLE BELOW?

| VERIFICATION APPARATUS NAME | BCC001 | |
|---|---|---|
| PQX PARAMETER NAMES | ONE-DIMENSIONAL/ TWO-DIMENSIONAL | VERIFICATION RESULT DATA ELEMENT NAMES |
| BarcodeSymbology | ONE-DIMENSIONAL | Code Symbology |
| ReporterIdLink | ONE-DIMENSIONAL | |
| Codewords | ONE-DIMENSIONAL | ASCII Values |
| OverallSymbolGrade | ONE-DIMENSIONAL | Result Grade |
| MinimumReflectance | ONE-DIMENSIONAL | Min Reflect |
| SymbolContrast | ONE-DIMENSIONAL | Sym Contrast |
| MinimumEdgeContrast | ONE-DIMENSIONAL | Min Edge Contrast |
| Modulation | ONE-DIMENSIONAL | Modul |
| BarcodeDefects | ONE-DIMENSIONAL | Bar Defect |
| Decodability | ONE-DIMENSIONAL | Decodability |
| Decode | ONE-DIMENSIONAL | Decode |
| UnusedErrorCorrection | TWO-DIMENSIONAL | Unused Err Correct |
| CodewordYield | TWO-DIMENSIONAL | Codeword Yield |
| GridNonuniformity | TWO-DIMENSIONAL | Grid Nonu |
| AxialNonuniformity | TWO-DIMENSIONAL | Axia Nonu |
| FixedPatternDamage | TWO-DIMENSIONAL | Fixed Pat Damage |

— 506

594 — [ CANCEL ]   [ OK ] — 595

FIG. 5CB

596 — START   597 — END

VERIFICATION RESULT DATA

| Test Device | Firm-ware | | | | | | | | | | | | | |
|---|---|---|---|---|---|---|---|---|---|---|---|---|---|---|
| BCC 001 | 1.23 | | | | | | | | | | | | | |

| No. | Date & time | Object Link | Code Sym-bology | Standard | Result Grade | ASCII Values | Min Reflect | Sym Contrast | Min Edge Contrast | Moduli | Bar Defect | Decoda-bility | De-code | Un-used Err Correct | Code -word Yield | Grid Nonu | Axia Nonu | Fixed Pat Damage |
|---|---|---|---|---|---|---|---|---|---|---|---|---|---|---|---|---|---|---|
| 1 | 3 Mar 2020 11:03:05 AM | Barcode .jpg | QR | ISO 15415 | A | https:// oweb. abc.jp/ e-support /index. html | A | A | A | A | A | A | A | A | A | A | A | A |
| 2 | 3 Mar 2020 11:03:06 AM | Barcode .png | Maxi Code | ISO 15415 | A | https:// abc.jp/ download /page. html | A | A | A | A | A | A | A | A | A | A | A | A |
| 3 | 3 Mar 2020 | Barcode .png | Data Matrix | ISO 15415 | | https:// abc.jp/ | | | | | | | | | | | | |

501  508

BARCODE VERIFICATION
PLEASE DESIGNATE CORRESPONDENCE BETWEEN PQX PARAMETERS
ON LEFT AND EACH PIECE OF VERIFICATION RESULT DATA ON RIGHT.

PQX PARAMETER

```
<BarcodeReport>
 <VerificationSet>
  <CustomerItemIdLink>
  <PositionOnSample>
  <Barcode2DEntry>
   <BarcodeSymbology>☐</BarcodeSymbology>
   <ReporterIdLink>☐</ReporterIdLink>
   <Codewords>☐</Codewords>
   <ISO2DVerification>
    <OverallSymbolGrade>☐</OverallSymbolGrade>
    <MinimumReflectance>☐</MinimumReflectance>
    <SymbolContrast>☐</SymbolContrast>
    <MinimumEdgeContrast>☐</MinimumEdgeContrast>
    <Modulation>☐</Modulation>
    <BarcodeDdefects>☐</BarcodeDefects>
    <Decodability>☐</Decodability>
    <Decode>☐</Decode>
    <UnusedErrorCorrection>☐</UnusedErrorCorrection>
    <CodewordYield>☐</CodewordYield>
    <GridNonuniformity>☐</GridNonuniformity>
    <AxialNonuniformity>☐</AxialNonuniformity>
    <FixedPatternDamage>☐</FixedPatternDamage>
     <FPDDetails>...</FPDDetails>
   </ISO2DVerification>
  </Barcode2DEntry>
 </VerificationSet>
</BarcodeReport>
```

VERIFICATION RESULT DATA

| Test Device | Firm-ware | | | | | | | | | | | | | | | | | |
|---|---|---|---|---|---|---|---|---|---|---|---|---|---|---|---|---|---|---|
| BCC 001 | 1.23 | | | | | | | | | | | | | | | | | |
| No. | Date & time | 543 Object Link | 544 Code Sym-bology | 545 Standard | 546 Result Grade | 547 ASCII Values | 548 Min Reflect | 549 Sym Contrast | 550 Min Edge Contrast | 551 Modul | 552 Bar Defect | 553 Decoda -bility | 554 De-code | 555 Un-used Err Correct | 556 Code -word Yield | 557 Grid Nonu | 558 Axia Nonu | 559 Fixed Pat Damage |
| 1 | 3 Mar 2020 11:03:05 AM | Barcode .jpg | QR | ISO 15415 | A | https:// oweb. abc.jp/ e-support /index. html | A | A | A | A | A | A | A | A | A | A | A | A |
| 2 | 3 Mar 2020 11:03:06 AM | Barcode .png | Maxi Code | ISO 15415 | A | https:// abc.jp/ download /page. html | A | A | A | A | A | A | A | A | A | A | A | A |
| 3 | 3 Mar 2020 | Barcode .png | Data Matrix | ISO 15415 | | https:// abc.jp/ | | | | | | | | | | | | |

597 END

FIG. 6A

| | 601 | 602 | 603 | 604 | 605 | 606 | 607 | 608 | 609 | 610 | 611 | 612 | 613 | 614 | 615 | 616 | 617 | 618 | 619 |
|---|---|---|---|---|---|---|---|---|---|---|---|---|---|---|---|---|---|---|---|
| 631 | Test Device | Firm-ware | | | | | | | | | | | | | | | | | |
| 632 | BCC 001 | 1.23 | | | | | | | | | | | | | | | | | |
| 633 | No. | Date & time | Object Link | Code Symbology | Standard | Result Grade | ASCII Values | Min Reflect | Sym Contrast | Min Edge Contrast | Modul | Bar Defect | Decoda-bility | De-code | Un-used Err Correct | Code-word Yield | Grid Nonu | Axia Nonu | Fixed Pat Damage |
| 634 | 1 | 3 Mar 2020 11:03:05 AM | Barcode .jpg | QR | ISO 15415 | A | https:// cweb. abc.jp/ e-support /index. html | A | A | A | A | A | A | A | A | A | A | A | A |
| 635 | 2 | 3 Mar 2020 11:03:06 AM | Barcode .png | Maxi Code | ISO 15415 | A | https:// abc.jp/ download /page. html | A | A | A | A | A | A | A | A | A | A | A | A |
| 636 | 3 | 3 Mar 2020 11:03:07 AM | Barcode .png | Data Matrix | ISO 15415 | A | https:// abc.jp/ corp/ | A | A | A | A | A | A | A | A | A | A | A | A |
| 637 | 4 | 3 Mar 2020 11:03:08 AM | Barcode. bmp | PDF-417 | ISO 15415 | A | https:// abc.jp/ info/ | A | A | A | A | A | A | A | A | A | A | A | A |
| 638 | 5 | | | | | | | | | | | | | | | | | | |

FIG. 6B

| VERIFICATION APPARATUS NAME 671 | | |
|---|---|---|
| PQX PARAMETER NAMES 643 | ONE-DIMENSIONAL/ TWO-DIMENSIONAL | VERIFICATION RESULT DATA ELEMENT NAMES 644 |
| BarcodeSymbology | ONE-DIMENSIONAL | |
| ReporterIdLink | ONE-DIMENSIONAL | |
| Codewords | ONE-DIMENSIONAL | |
| OverallSymbolGrade | ONE-DIMENSIONAL | |
| MinimumReflectance | ONE-DIMENSIONAL | |
| SymbolContrast | ONE-DIMENSIONAL | |
| MinimumEdgeContrast | ONE-DIMENSIONAL | |
| Modulation | ONE-DIMENSIONAL | |
| BarcodeDefects | ONE-DIMENSIONAL | |
| Decodability | ONE-DIMENSIONAL | |
| Decode | ONE-DIMENSIONAL | |
| UnusedErrorCorrection | TWO-DIMENSIONAL | |
| CodewordYield | TWO-DIMENSIONAL | |
| GridNonuniformity | TWO-DIMENSIONAL | |
| AxialNonuniformity | TWO-DIMENSIONAL | |
| FixedPatternDamage | TWO-DIMENSIONAL | |

FIG. 6C

| VERIFICATION APPARATUS NAME (671) | | BCC001 (643) | |
|---|---|---|---|
| PQX PARAMETER NAMES | | ONE-DIMENSIONAL/ TWO-DIMENSIONAL | VERIFICATION RESULT DATA ELEMENT NAMES (644) |
| 651 | BarcodeSymbology | ONE-DIMENSIONAL | Code Symbology (672) |
| 652 | ReporterIdLink | ONE-DIMENSIONAL | (673) |
| 653 | Codewords | ONE-DIMENSIONAL | (674) |
| 654 | OverallSymbolGrade | ONE-DIMENSIONAL | (675) |
| 655 | MinimumReflectance | ONE-DIMENSIONAL | (676) |
| 656 | SymbolContrast | ONE-DIMENSIONAL | (677) |
| 657 | MinimumEdgeContrast | ONE-DIMENSIONAL | (678) |
| 658 | Modulation (667) | ONE-DIMENSIONAL | (679) |
| 659 | BarcodeDefects | ONE-DIMENSIONAL | (680) |
| 660 | Decodability | ONE-DIMENSIONAL | (681) |
| 661 | Decode | ONE-DIMENSIONAL | (682) |
| 662 | UnusedErrorCorrection | TWO-DIMENSIONAL | (683) |
| 663 | CodewordYield | TWO-DIMENSIONAL | (684) |
| 664 | GridNonuniformity | TWO-DIMENSIONAL | (685) |
| 665 | AxialNonuniformity | TWO-DIMENSIONAL | (686) |
| 666 | FixedPatternDamage | TWO-DIMENSIONAL | (687) |

| VERIFICATION APPARATUS NAME (641) | BCC001 (643) | | |
|---|---|---|---|
| PQX PARAMETER NAMES (642) | ONE-DIMENSIONAL/ TWO-DIMENSIONAL (671) | VERIFICATION RESULT DATA ELEMENT NAMES (644) | |
| BarcodeSymbology (651) | ONE-DIMENSIONAL | Code Symbology | (672) |
| ReporterIdLink (652) | ONE-DIMENSIONAL | Barcode.jpg | (673) |
| Codewords (653) | ONE-DIMENSIONAL | ASCII Values | (674) |
| OverallSymbolGrade (654) | ONE-DIMENSIONAL | Result Grade | (675) |
| MinimumReflectance (655) | ONE-DIMENSIONAL | Min Reflect | (676) |
| SymbolContrast (656) | ONE-DIMENSIONAL | Sym Contrast | (677) |
| MinimumEdgeContrast (657) | ONE-DIMENSIONAL | Min Edge Contrast | (678) |
| Modulation (658) | ONE-DIMENSIONAL | Modul | (679) |
| BarcodeDefects (659) | ONE-DIMENSIONAL | Bar Defect | (680) |
| Decodability (660) | ONE-DIMENSIONAL | Decodability | (681) |
| Decode (661) | ONE-DIMENSIONAL | Decode | (682) |
| UnusedErrorCorrection (662) | TWO-DIMENSIONAL | Unused Err Correct | (683) |
| CodewordYield (663) | TWO-DIMENSIONAL | Codeword Yield | (684) |
| GridNonuniformity (664) | TWO-DIMENSIONAL | Grid Nonu | (685) |
| AxialNonuniformity (665) | TWO-DIMENSIONAL | Axia Nonu | (686) |
| FixedPatternDamage (666) | TWO-DIMENSIONAL | Fixed Pat Damage | (687) |

FIG. 6E

| PQX PARAMETER NAMES | 1 | 2 | 3 | 4 |
|---|---|---|---|---|
| BarcodeSymbology | QR | MaxiCode | DataMatrix | PDF-417 |
| ReporterIdLink | Barcode.jpg | Barcode.png | Barcode.png | Barcode.bmp |
| Codewords | https:cweb.abc.jp/e-support/index.html | https:abc.jp/download/page.html | https:abc.jp/corp/ | https:abc.jp/info/ |
| OverallSymbolGrade | A | A | A | A |
| MinimumReflectance | A | A | A | A |
| SymbolContrast | A | A | A | A |
| MinimumEdgeContrast | A | A | A | A |
| Modulation | A | A | A | A |
| BarcodeDefects | A | A | A | A |
| Decodability | A | A | A | A |
| Decode | A | A | A | A |
| UnusedErrorCorrection | A | A | A | A |
| CodewordYield | A | A | A | A |
| GridNonuniformity | A | A | A | A |
| AxialNonuniformity | A | A | A | A |
| FixedPatternDamage | A | A | A | A |

FIG. 6F

| NUMBER OF DIMENSIONS | STANDARD | Symbology |
|---|---|---|
| ONE-DIMENSIONAL | ISO15416 | JAN, EAN ... |
| TWO-DIMENSIONAL | ISO15415 | QR, PDF417 ... |

FIG. 7A

```
<Barcode2DEntry>
<BarcodeSymbology>QR</BarcodeSymbology>
<ReporterIdLink>Barcode.jpg</ReporterIdLink>
<Codewords>https://cweb.abc.jp/e-support/index.html</Codewords>
<ISO2DVerification>
<OverallSymbolGrade>A</OverallSymbolGrade>
<MinimumReflectance>A</MinimumReflectance>
<SymbolContrast>A</SymbolContrast>
<MinimumEdgeContrast>A</MinimumEdgeContrast>
<Modulation>A</Modulation>
<BarcodeDdefects>A</BarcodeDefects>
<Decodability>A</Decodability>
<Decode>A</Decode>
<UnusedErrorCorrection>A</UnusedErrorCorrection>
<CodewordYield>A</CodewordYield>
<GridNonuniformity>A</GridNonuniformity>
<AxialNonuniformity>A</AxialNonuniformity>
<FixedPatternDamage>A</FixedPatternDamage>
</ISO2DVerification>
<FPDDetails></FPDDetails>
</Barcode2DEntry>
```

FIG. 7B

```
<Barcode2DEntry>
<BarcodeSymbology>MaxiVode</BarcodeSymbology>
<ReporterIdLink>Barcode.png</ReporterIdLink>
<Codewords>https://abc.jp/download/page.html</Codewords>
<ISO2DVerification>
<OverallSymbolGrade>A</OverallSymbolGrade>
<MinimumReflectance>A</MinimumReflectance>
<SymbolContrast>A</SymbolContrast>
<MinimumEdgeContrast>A</MinimumEdgeContrast>
<Modulation>A</Modulation>
<BarcodeDdefects>A</BarcodeDefects>
<Decodability>A</Decodability>
<Decode>A</Decode>
<UnusedErrorCorrection>A</UnusedErrorCorrection>
<CodewordYield>A</CodewordYield>
<GridNonuniformity>A</GridNonuniformity>
<AxialNonuniformity>A</AxialNonuniformity>
<FixedPatternDamage>A</FixedPatternDamage>
</ISO2DVerification>
<FPDDetails></FPDDetails>
</Barcode2DEntry>
```

F I G. 7C

```
<Barcode2DEntry>
<BarcodeSymbology>DataMatrix</BarcodeSymbology>
<ReporteridLink>Barcode.png</ReporteridLink>
<Codewords>https://abc.jp/corp/</Codewords>
<ISO2DVerification>
    <OverallSymbolGrade>A</OverallSymbolGrade>
    <MinimumReflectance>A</MinimumReflectance>
    <SymbolContrast>A</SymbolContrast>
    <MinimumEdgeContrast>A</MinimumEdgeContrast>
    <Modulation>A</Modulation>
    <BarcodeDdefects>A</BarcodeDefects>
    <Decodability>A</Decodability>
    <Decode>A</Decode>
    <UnusedErrorCorrection>A</UnusedErrorCorrection>
    <CodewordYield>A</CodewordYield>
    <GridNonuniformity>A</GridNonuniformity>
    <AxialNonuniformity>A</AxialNonuniformity>
    <FixedPatternDamage>A</FixedPatternDamage>
</ISO2DVerification>
<FPDDetails></FPDDetails>
</Barcode2DEntry>
```

F I G. 7D

```
<Barcode2DEntry>
<BarcodeSymbology>PDF-417</BarcodeSymbology>
<ReporteridLink>Barcode.bmp</ReporteridLink>
<Codewords>https://abc.jp/info/</Codewords>
<ISO2DVerification>
    <OverallSymbolGrade>A</OverallSymbolGrade>
    <MinimumReflectance>A</MinimumReflectance>
    <SymbolContrast>A</SymbolContrast>
    <MinimumEdgeContrast>A</MinimumEdgeContrast>
    <Modulation>A</Modulation>
    <BarcodeDdefects>A</BarcodeDefects>
    <Decodability>A</Decodability>
    <Decode>A</Decode>
    <UnusedErrorCorrection>A</UnusedErrorCorrection>
    <CodewordYield>A</CodewordYield>
    <GridNonuniformity>A</GridNonuniformity>
    <AxialNonuniformity>A</AxialNonuniformity>
    <FixedPatternDamage>A</FixedPatternDamage>
</ISO2DVerification>
<FPDDetails></FPDDetails>
</Barcode2DEntry>
```

FIG. 8A
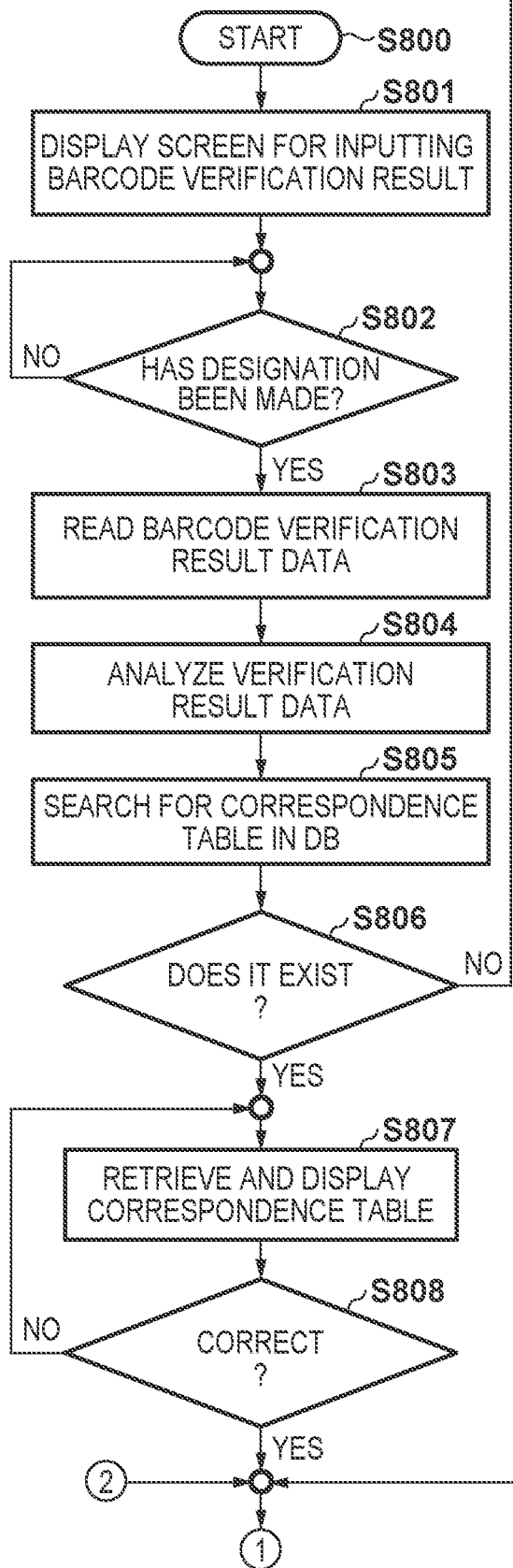
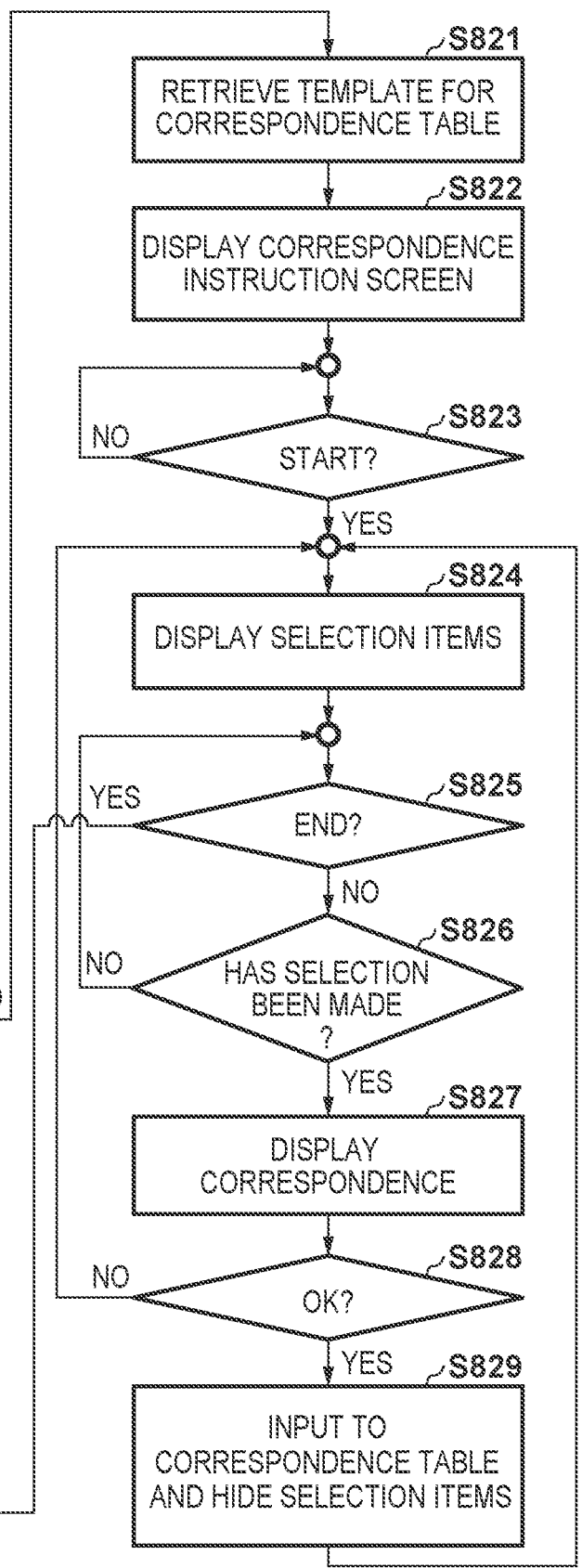

INFORMATION PROCESSING SYSTEM, INFORMATION PROCESSING APPARATUS, METHOD OF CONTROLLING THE SAME, AND STORAGE MEDIUM

BACKGROUND OF THE INVENTION

Field of the Invention

The present invention relates to an information processing system, an information processing apparatus, a method of controlling the same, and a storage medium.

Description of the Related Art

There are several forms of print services called print on demand (POD), production printing, and commercial printing. In such forms of printing services, there are customers who order/request printing (also called end users) and printing companies that provide print products. Customers order print products by providing the printing companies with specifications for print products for which they are placing an order and, if necessary, image data to be used for printing. The specifications for print products are matters that determine the details of the print products, such as the type of sheet to be used, finishing settings such as book binding and stapling, the number of sheets to be printed, and the number of copies, for example. Using the details requested in this way and image data, the printing companies create print products and deliver them to the customers.

In such commercial printing services, printing companies use various devices and software to perform everything from receiving orders to delivering print products. These devices include printing apparatuses for printing on sheets, finishers for book binding/stapling, and verification apparatuses for inspecting/verifying print products. Web servers for receiving orders for print products from customers and terminals and software for managing the production of print products are also used. Also, there are multiple users for these devices and software. For example, there are order receivers who manage orders and communicate with customers, process designers who design operation processes to completion of print products, operators who operate printing apparatuses and verification apparatuses, and quality checkers who confirm the quality of final print products. In addition, there are printing companies with multiple production sites, and in such printing companies, the production site to produce the print product is decided based on the content of the order.

In commercial printing services, printing companies often have customers designating quality requirements for print products. Unlike specifications for print products, quality requirements indicate requirements related to the quality of print products, such as a registration error amount for images on the front and back of a printed sheet and the amount of variation in color values of images between a plurality of copies or a plurality of pages. Since print products range over distribution items such as flyers and pamphlets, photo albums, books, business cards, exhibition panels, and the like, and their applications and prices vary, desired requirements and levels with respect to quality requirements also vary. As will be described later, since operation processes to satisfy quality requirements and a quality confirmation process for print products are required at printing companies, it is common for the cost of print products to increase as the level of quality requirements increase. Printing companies create print products while performing various adjustment operations to satisfy quality requirements. For example, various adjustments of a printing apparatus to adjust to a specific color on a specific sheet based on a sample printing result which has been agreed upon with a customer as well as post-printing verification to remove print products that do not satisfy quality requirements as defective products are performed. Through verification, printing companies confirm whether the quality of print products achieved by the adjustments meets the quality requirements that customers require.

There will be many types of operations to satisfy customers' quality requirements for print products, especially when orders for print products of various specifications/quality requirements are received from many customers, and the time required for those operations will be long. For example, assume that, for a print product A, a registration error for the front and back of a sheet is required as a quality requirement, and for a print product B, a consistency with a color sample that a customer presented is required as a quality requirement. In such a case, an order receiver needs to transmit the quality conditions of the respective print products to a process designer using a data format that their printing company uses. Then, based on the types, states, and the like of printing apparatuses and software that their printing company can use, the process designer determines operation processes for the production of the respective print products to satisfy the quality requirements thereof. For example, operations such as adjusting devices of a printing apparatus and color proofing for a printing apparatus are determined for the print product A and the print product B, respectively, and in addition, operations for confirming the result of each operation, such as a colorimetric operation after color calibration, are determined. In addition, a verification method which indicates how to confirm that produced print products satisfy quality requirements, such as a location for confirming a registration error for the front and back of a sheet and the maximum value of an allowable error amount, is determined. It is common for printing companies to use multiple printing apparatuses, and process designers need to select the most suitable printing apparatus from the multiple printing apparatuses to satisfy the quality requirements for a print product for which an order has been placed. As described above, printing companies need to define workflows for producing print products that satisfy quality requirements and for confirming the quality of produced print products, respectively. Then, operators of printing companies receive operation processes thus determined and operate printing apparatuses and software. Then, based on produced print products and a verification method, quality checkers inspect whether print products meet quality requirements. As described above, printing companies spend a lot of operational effort determining operation processes to satisfy quality requirements.

Conventionally, when customers and printing companies send and receive these quality requirements, a unified information format is not defined and, therefore, not used. Thus, printing companies would receive quality requirements in different formats from multiple customers. Accordingly, printing companies need to design operation processes to satisfy quality requirements based on quality requirements received in different information formats, and inconvenience arises from that operation. Meanwhile, on a customer side, when placing orders for print products to a plurality of printing companies, a customer has to send quality requirements in different formats, and this complicated the operation of placing orders.

Japanese Patent Laid-Open No. H7-105300 describes comparing a read result of a barcode that a barcode verification apparatus inspected and a correct value of the barcode and, if they do not coincide, performing reprinting.

Print quality requirements for print products are described in PRX (Print Requirement eXchange) format data (PRX data). Creating PQX (Print Quality eXchange) format data (PQX data), after printing has been performed in accordance with such requirements, for the results of inspecting the quality of that printing has been considered. However, since barcode verification, for example, is not integrated in-line in a printing system, verification is conducted by conveying print products to an off-line barcode verification apparatus after the print products has been generated. Therefore, it is necessary to import verification result data from the barcode verification apparatus to the printing system via a USB memory or a network, for example. Furthermore, there is a problem that a method for describing a verification result in PQX data after verification result data is imported into the printing system in this way has not been considered.

SUMMARY OF THE INVENTION

An aspect of the present invention is to eliminate the above-mentioned problem with conventional technology.

A feature of the present invention is to provide a technique for importing verification result data from a verification apparatus and then creating a description document in a standardized predetermined format.

According to a first aspect of the present invention, there is provided an information processing system operable to perform processing of a print job including a quality requirement of a quality verification of a print product, the system comprising: a printing apparatus configured to execute the print job and generate a print product; a verification apparatus configured to verify the print product and create verification result data; and an information processing apparatus configured to create, from the verification result data created in the verification apparatus, a description document of a predetermined format in which verification result data of a corresponding print product is described, wherein the information processing apparatus comprises: a controller having one or more processors which executes instructions stored in one or more memories that causes the information processing apparatus to act as: an input unit configured to input the verification result data created in the verification apparatus; a conversion unit configured to, using a correspondence table in which each parameter of the description document and an element of the verification result data inputted by the input unit are associated, convert a value of each element of the verification result data to a value of a respective parameter of the description document; and a generation unit configured to generate the description document of the predetermined format based on the value of each parameter converted by the conversion unit.

According to a second aspect of the present invention, there is provided an information processing apparatus operable to create, from verification result data of a print product generated by executing a print job including a quality requirement of a quality verification of a print product, a description document of a predetermined format in which verification result data of that print product is described, the apparatus comprising: a controller having one or more processors which executes instructions stored in one or more memories that causes the image forming apparatus act as: an input unit configured to input the verification result data of the print product created in the verification apparatus; a conversion unit configured to, using a correspondence table in which each parameter of the description document and an element of the verification result data inputted by the input unit are associated, convert a value of each element of the verification result data to a value of a respective parameter of the description document; and a creation unit configured to create the description document of the predetermined format based on the value of each parameter converted by the conversion unit.

According to a third aspect of the present invention, there is provided a method of controlling an information processing apparatus operable to create, from verification result data of a print product generated by executing a print job including a quality requirement of a quality verification of a print product, a description document of a predetermined format in which verification result data of that print product is described, the method comprising: inputting the verification result data of the print product created in the verification apparatus; using a correspondence table in which each parameter of the description document and an element of the verification result data inputted in the inputting are associated, converting a value of each element of the verification result data to a value of a respective parameter of the description document; and creating the description document of the predetermined format based on the value of each parameter converted.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A is a diagram illustrating a specific example of describing PQX data for a one-dimensional barcode in the embodiment.

FIG. 4B is a diagram illustrating a specific example of describing PQX data for a two-dimensional barcode in the embodiment.

FIG. 5BA and FIG. 5BB are diagrams illustrating examples of displaying a result of the workflow management server according to the embodiment reading the selected CSV data and then determining whether or not a correspondence table for the verification apparatus that generated that data already exists.

FIG. 5DA and FIG. 5DB are diagrams illustrating examples of a screen displayed when a "start" button has been pressed in FIGS. 5CA and 5CB.

FIG. 6A is a diagram illustrating an example of verification result data that a certain manufacturer's barcode verification apparatus generated.

FIG. 6B is a diagram illustrating an example of a template of a correspondence table describing a correspondence between PQX data parameters and CSV data parameter names in FIG. 6A.

FIG. 6C is a diagram illustrating part way through a creation of a correspondence table for a barcode verification apparatus based on a template of FIG. 6B.

FIG. 6D is a diagram illustrating a state in which the creation of the correspondence table for the barcode verification apparatus has advanced and the correspondence between all the PQX parameters and the verification result data element names of the CSV data has been completed.

FIG. 6E is a diagram illustrating an example of converted verification result data in which the verification result values of the respective PQX parameters are displayed in CSV format data created from the correspondence table of FIG. 6D and the CSV data of FIG. 6A.

FIG. 6F is a diagram illustrating an example of a table listing names of standards for a one-dimensional barcode and a two-dimensional barcode and examples of barcode types.

FIG. 7A to FIG. 7D are diagrams illustrating examples of PQX data in which the converted verification result data of FIG. 6E according to the embodiment is indicated in a PQX format.

FIGS. 8A and 8B are flowcharts for describing processing of the workflow management server according to the embodiment.

DESCRIPTION OF THE EMBODIMENTS

Figure 1:
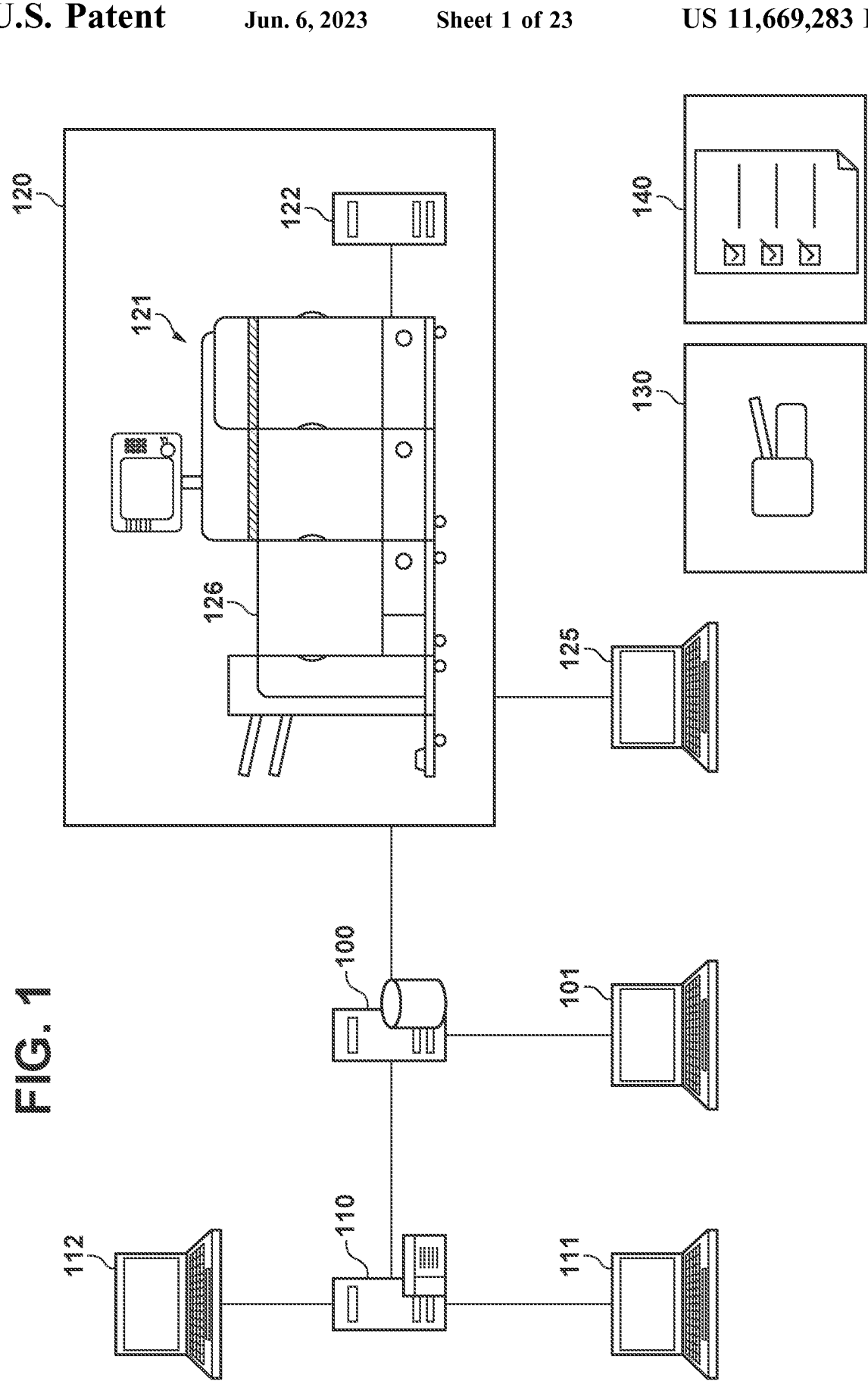
FIG. 1 is a diagram illustrating a configuration of a commercial printing system according to an embodiment of the present invention.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined.

In particular, embodiments will be described on the assumption that PRX data is used as the format for files that define the criteria for print quality requirements for print jobs and that PQX data is used as the format for files that define the quality level of print products. However, the present invention is not limited to PRX or PQX, and any format may be used as long as it is a data format that defines the quality requirements of print jobs.

A PRX format refers to a standardized data format for quality requirements necessary for printing. The PRX format is considered as a means for unifying data formats for transmitting quality requirements and, therefore, as a standardization technology. Using PRX makes it possible for quality requirements for different customers or different orders to be described in a uniform standardized data format. Using PRX in this way makes it possible for quality requirements which were previously not unified to be transmitted in a unified data format.

Using PRX data describing quality requirements that customers require makes it possible for a printing system to formulate operation processes to be carried out at the time of production of print products to satisfy quality requirements and operation processes for quality confirmation of print products without the intervention of operators. Thus, presetting for printing apparatuses and software can be performed automatically.

In addition, as described above, a quality checker inspects the quality of print products to confirm that produced print products satisfy quality requirements and record the results thereof. For example, a registration error amount for images on the front and back of a sheet or the amount of variation in color values of images between a plurality of copies or a plurality of pages is measured, and the values thereof are recorded. In addition, the print quality of printed barcodes or QR codes of print products is inspected by a verification apparatus, and the grade of quality is recorded based on the verification results. In addition, print products are visually inspected by a person so that there are no image defects such as so-called void images and spot images, and the results thereof are recorded.

Note that, in the following embodiments, description will be given for an information processing system according to the present invention using a commercial printing system as an example and description will be given for an information processing apparatus according to the present invention using a workflow management server as an example. In the embodiments, description will be given using a case where the workflow management server creates a PQX (Print Quality eXchange) format (predetermined format) description document (PQX data) based on verification result data of a verification apparatus.

FIG. 1 is a diagram for describing a configuration of a commercial printing system according to an embodiment of the present invention.

A workflow management server 100 manages the entire workflow for processing print jobs. A workflow management terminal 101 is a terminal operated by a workflow administrator, is connected to the workflow management server 100 via a network, executes various functions, and receives and displays information from the workflow management server 100. Specifically, this includes setting/changing a workflow management function, confirming the status of each device of a production system 120, displaying information related to inconsistencies between print data and PRX data, and the like. Note that although only one production system 120 is illustrated in FIG. 1, the workflow management server 100 may manage a plurality of production systems 120. In that case, a production system 120 that is appropriate for the content of a print job is selected in view of the capabilities of the production systems such as whether or not color printing is possible and printing speed, states such as how crowded print job processes are at that time, and the like. Then, the selected production system 120 is caused to process the print job.

An order system server 110 accepts orders from end users for print products of commercial printing. An order system management terminal 111 is a terminal operated by an order system administrator, is connected to the order system server 110 through a network, and executes the functions of the order system server 110. An end user terminal 112 is a terminal operated by an end user places an order for a print job from the terminal 112 to an order system.

The production system 120 is a system for producing print products in commercial printing. Specifically, the production system 120 includes a printing apparatus 121, a print server 122 for controlling the printing apparatus 121, and the like. An in-line verification apparatus 126 is integrated in the printing apparatus 121. The in-line verification apparatus 126 is a type of accessory unit connected in-line to the printing apparatus 121. The in-line verification apparatus 126 has functions of scanning a printed image with a sensor therein, measuring lengths by which an image of a print product shifts in a vertical and/or horizontal direction with respect to a sheet or images of a print product shift between the front and back of a sheet, and measuring a tint of a certain part of an image. Since the in-line verification apparatus 126 is connected in-line to the printing apparatus 121, verification for a registration error and tint to be described later can be performed by these functions while the printing apparatus 121 is printing. The print server 122 performs printing processing based on data and instructions from the workflow management server 100 and issues printing instructions to the printing apparatus 121. The printing apparatus 121 executes printing based on data and instructions from the print server 122. The printing method is not particularly limited and may be any of an electrophotographic method, an ink jet method, and another method.

Printing is performed by the printing apparatus 121, and after an image is formed on a sheet, the sheet is transported to the in-line verification apparatus 126 to inspect the printed image, and after that, processing such as stapling or punching is performed by an apparatus called an accessory to which the sheet is transported. A production operator terminal 125 is a terminal operated by an operator who operates various devices of the production system 120, is connected via a network to the production system 120, and has functions such as confirming the operation statuses of devices and confirming error information when abnormalities occur. As another embodiment, configuration may be taken such that a UI (User Interface) operation module provided in each device serves these functions instead of an external terminal.

An off-line verification apparatus 130 is an apparatus for inspecting print products printed by the production system 120. The in-line verification apparatus 126 is integrated in the printing apparatus 121, whereas the off-line verification apparatus 130 is not connected to the printing apparatus 121 by a sheet conveyance path. Therefore, in order to perform verification in the off-line verification apparatus 130, it is necessary to manually carry print products printed by the printing apparatus 121 to the off-line verification apparatus 130. Note that the in-line verification apparatus 126 and the off-line verification apparatus 130 are distinguished by whether or not they are connected to the printing apparatus 121 by a sheet conveyance path, and whether or not they are connected to the commercial printing system via a network is irrelevant. Although the off-line verification apparatus 130 in FIG. 1 is represented in a form not connected via a network, it may be connected. Description will be given such that either case can be realized.

Next, a flow from when the commercial printing system according to the embodiment receives an order for a print job to when printing is performed will be described.

First, an end user connects to the order system server 110 through a network from the end user terminal 112 and selects a print product, transmits document data, places an order, and the like from a UI, such as a web browser, with respect to the order system server 110. In this way, print jobs are ordered. Since one or more end users order one or more print jobs, the order system server 110 holds order data of one or more print jobs.

Next, an order system administrator connects from the order system management terminal 111 to the order system server 110, which holds the order data of one or more print jobs, and executes the functions of the order system server 110 from a UI such as a web browser. Specifically, the functions include setting a required quality for each print product, confirming the status for each print job for which an order has been placed, viewing quality information of print products for each print job for which an order has been placed, and the like.

Next, a workflow administrator connects to the workflow management server 100 from the workflow management terminal 101 and executes the functions of the workflow management server 100 from a UI such as a web browser. Specifically, connection is made to the order system server 110, a print job to be executed is selected from a plurality of print jobs held therein, order data is obtained, and the data is held in the workflow management server 100. The workflow management server 100 receives PRX data, which is print data or quality requirement information, from the order system server 110. Then, the PRX data received from the order system server 110 is interpreted to determine the production system 120 for each print job for which an order has been placed, execute pre-press processing of print data, and the like. Note that, in the embodiment, a preparation process for inspecting fonts, spot colors, and the like used for print data with respect to the print data before the printing apparatus 121 performs print processing so as to perform printing without any problem is called pre-press processing. By performing this pre-press processing, the obtained order data is analyzed to determine whether conditions that enable printing are satisfied and the production system 120 is instructed to print those determined to be printable. Further, when the workflow management server 100 instructs the production system 120 to perform print processing, the print server 122 receives print data. The print server 122 performs data processing commonly referred to as RIP (Raster Image Processing) to enable the printing apparatus 121 to print the print data and transmits the processed print data to the printing apparatus 121. Thus, the printing apparatus 121 receives print data and performs printing.

The workflow management server 100 makes an instruction for a verification for confirming the print quality of print products that were printed in accordance with PRX data. For example, the in-line verification apparatus 126 is instructed to perform a verification such as measuring a registration error amount of images on the front and back of a sheet or a tint of images between a plurality of copies or a plurality of pages as described above. A verification by the in-line verification apparatus 126 is performed in parallel when printing in the production system 120. This is performed by the workflow management server 100 instructing the content of verification performed by the in-line verification apparatus 126 to the production system 120 via the network.

In contrast, when performing a verification off-line, it is necessary to instruct a quality checker who operates the off-line verification apparatus 130 or performs the verification itself to perform the verification, and that quality checker performs a verification upon receiving that instruction. For example, when performing a barcode verification as described above, a quality checker sets a print product in a barcode verification apparatus, which is the off-line verification apparatus 130, and then starts a verification. Thus, in an off-line verification, the quality checker needs to properly know the verification that needs to be performed. Therefore, in the printing system, processes such as necessary verifications are often advanced using operation instruction sheets. Therefore, verification instruction sheets are used.

Next, the workflow management server 100 aggregates one or more verification results that are being held for each print job and describes the print quality of print products in PQX data. In addition, PRX data describing quality requirements for print products designated by a customer and PQX data are compared to determine whether the quality requirements are satisfied. After confirming that they are satisfied, generated PQX data is sent to the order system server 110.

The order system server 110 reports that the print quality of print products satisfies the quality requirements for print products designated by the customer. Then, the order system server 110 holds the PRX data and the PQX data so that they can be provided as necessary and sends the print products to a place designated by the customer to complete the print order. The above is the flow of processing from when the printing system according to the embodiment receives an order for a print job to when printing is performed.

Note that although the present embodiment is described as an on-premises server installed on a site where the workflow management server 100 performs workflow management, the present invention is not limited to this. As another embodiment, configuration may be taken such that the workflow management server 100 is constructed as a cloud server, and the workflow management terminal 101, which will be described later, is connected via the Internet. The same applies to the order system server 110 to be described later.

Further, although the embodiment is described as something in which the workflow management server 100 executes PRX data interpretation and print data pre-press processing, the present invention is not limited thereto. As another embodiment, the order system server 110 to be described later may execute the print data pre-press processing, or the print server 122 of the production system 120 to be described later may execute the print data pre-press processing. Also, PRX data interpretation and print data pre-press processing may be executed by another server. For example, the order system server 110 may interpret the PRX data and the workflow management server 100 may execute the pre-press processing.

Next, a hardware configuration of various apparatuses according to the present embodiment will be described.

Figure 2:
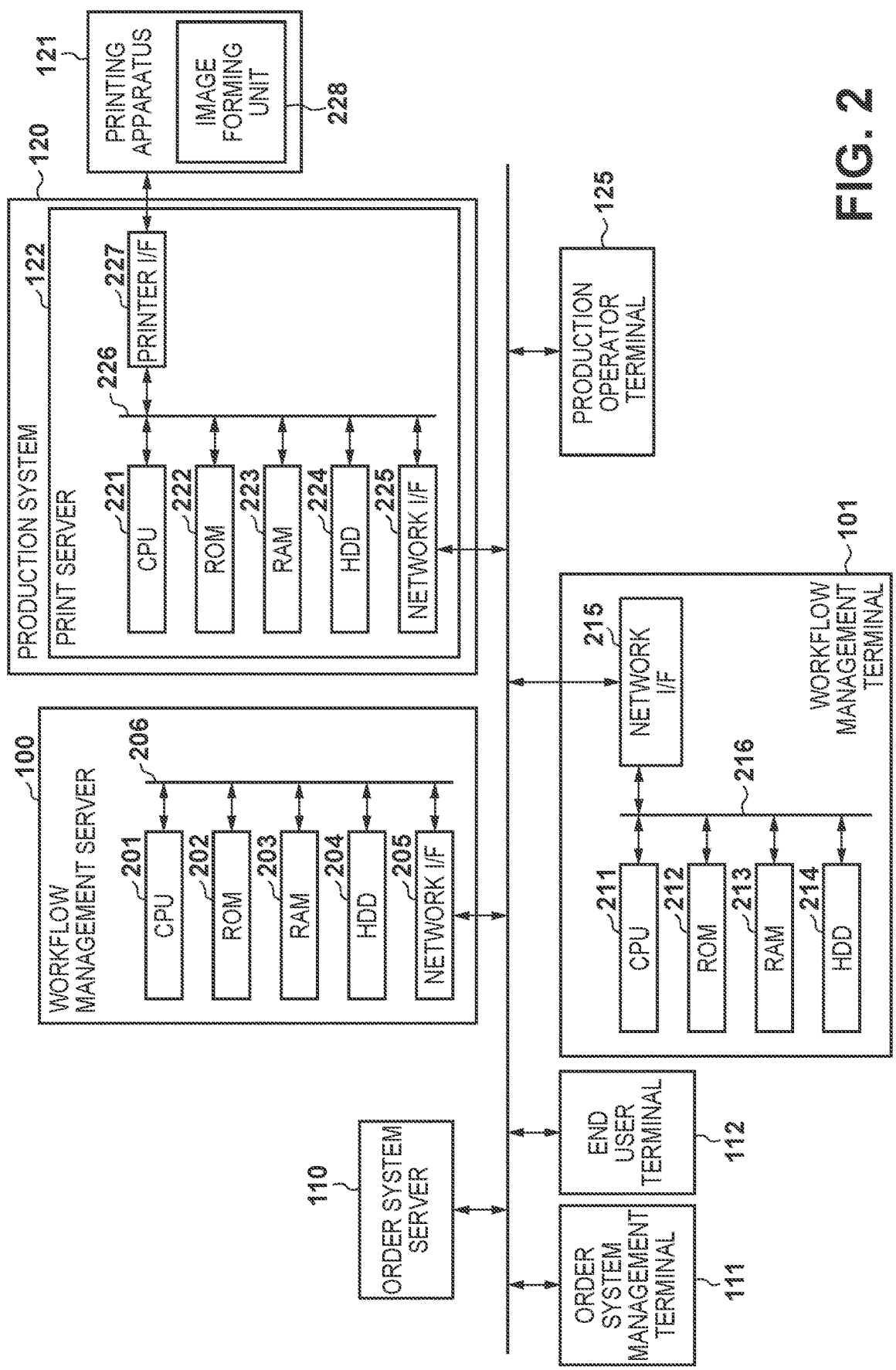
FIG. 2 is a block diagram for describing a hardware configuration of a production system including a workflow management server, a workflow management terminal, and a print server included in the commercial printing system according to the embodiment.

FIG. 2 is a block diagram for describing a hardware configuration of the production system 120 including the workflow management server 100, the workflow management terminal 101, and the print server 122 included in the commercial printing system according to the embodiment.

First, a hardware configuration of the workflow management server 100 will be described.

A CPU 201 deploys a control program stored in a ROM 202 or a hard disk (HDD) 204 into a RAM 203 and executes the deployed program to comprehensively control access to various devices connected to a system bus 206. The ROM 202 stores a control program or the like that can be executed by the CPU 201. The RAM 203 primarily functions as a main memory, a work area, or the like of the CPU 201 and is configured so as to be able to expand the memory capacity by an optional RAM connected to an expansion port (not illustrated). The hard disk drive (HDD) 204 stores an executable control program, a boot program, various applications, font data, user files, edit files, and the like. Note that although the HDD 204 is used in the embodiment, an SD card, a flash memory, or the like may be used as an external storage apparatus in addition to the HDD. The same applies to apparatuses having HDDs described below. A network I/F 205 communicates data with various apparatuses through the network.

Note that in the case of the order system server 110, the hardware configuration is substantially the same as that of the workflow management server 100, and therefore, a description thereof will be omitted.

Next, a hardware configuration of the workflow management terminal 101 will be described.

A CPU 211 deploys a control program stored in a ROM 212 or a hard disk (HDD) 214 into a RAM 213 and executes the deployed program to comprehensively control access to various devices connected to a system bus 216. The ROM 212 stores a control program or the like that can be executed by the CPU 211. The RAM 213 primarily functions as a main memory, a work area, or the like of the CPU 211 and is configured so as to be able to expand the memory capacity by an optional RAM connected to an expansion port (not illustrated). The HDD 214 stores a boot program, various applications, font data, user files, edit files, and the like. A network I/F 215 communicates data with other apparatuses through the network.

Note that the hardware configurations of the other terminal apparatuses such as the order system management terminal 111, the end user terminal 112, and the production operator terminal 125 are substantially the same as that of the workflow management terminal 101, and thus descriptions thereof will be omitted.

Next, a hardware configuration of the production system 120 will be described.

A CPU 221 of the print server 122 deploys a control program stored in a ROM 222 or a hard disk (HDD) 224 to a RAM 223. Then, the deployed program is executed to comprehensively control access to various devices connected to a system bus 226. The ROM 222 primarily stores a control program or the like that can be executed by the CPU 221. The RAM 223 primarily functions as a main memory, a work area, or the like of the CPU 221 and is configured so as to be able to expand the memory capacity by an optional RAM connected to an expansion port (not illustrated). The HDD 224 stores an executable control program, a boot program, various applications, font data, user files, edit files, and the like. A network I/F 225 communicates data with other apparatuses through the network. A printer I/F 227 controls an output of image data to an image forming unit 228 of the printing apparatus 121.

Next, a hardware configuration of the printing apparatus 121 will be described.

The image forming unit 228 prints an image on a sheet based on image data. The hardware configuration thereof is the same as that of a general printing apparatus. The printing apparatus 121 also includes hardware other than the image forming unit 228, but a configuration not directly related to the present invention is omitted here.

Figure 3:
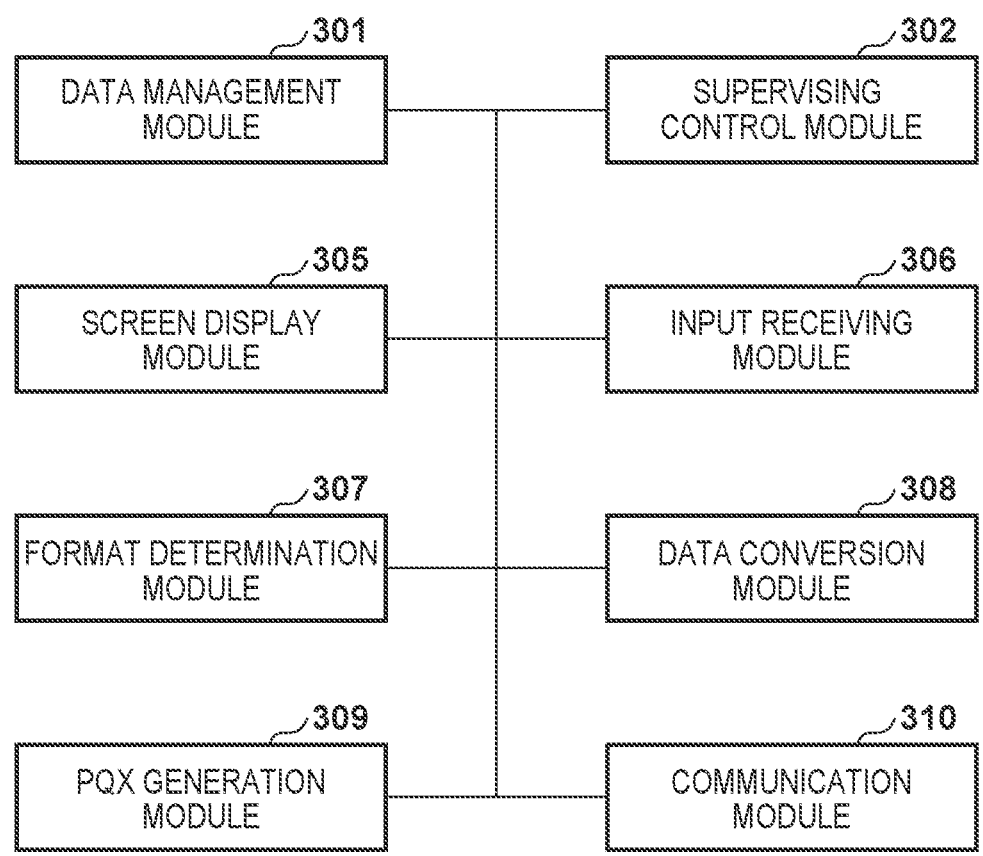
FIG. 3 is a functional block diagram for describing a software configuration of the workflow management server according to the embodiment.

FIG. 3 is a functional block diagram for describing a software configuration of the workflow management server 100 according to the embodiment. The functions of these software modules are realized by the CPU 201 deploying and executing programs stored in the ROM 202 or the HDD 204 into the RAM 203.

The data management module 301 receives print data and PRX data from the order system server 110 and manages them. A supervising control module 302 reads the PRX data and the print data from data management module 301, analyzes the PRX data and the print data, analyzes whether there is an inconsistency between the PRX data and the print data in accordance with a flowchart described later, and records the result thereof in a log file in the HDD 204. Note that the data management module 301 manages the log file and various other data to be described later. A screen display module 305 displays a screen of the workflow management server 100 to be displayed by the workflow management terminal 101. An input receiving module 306 receives an instruction inputted on the workflow management terminal 101 through the workflow management terminal 101. A format determination module 307 determines the format of PQX data. A data conversion module 308 converts an inputted verification result into a data format corresponding to the parameters of PQX data. A PQX generation module 309 generates PQX data in a PQX format. A communication module 310 is for the workflow management server 100 to communicate with other apparatuses and terminals over a network.

Note that although the embodiment will be described as having the PQX generation module 309 in the workflow management server 100, the present invention is not limited thereto. As another embodiment, the order system server 110 may have the PQX generation module 309 or the print server 122 of the production system 120 may have the PQX generation module 309.

FIGS. 4A and 4B are diagrams illustrating specific examples of describing PQX data for barcodes in the embodiment.

First, parts common between FIGS. 4A and 4B will be described.

Below an outermost tag PQX 401*a* of PQX data, the following four tags are nested within the tags, "SampleCollection" 402*a* and 402*b* and "Sample" 403*a* and 403*b*. Print quality verification results related to matters to which these four tags apply are described. These four tags include "ColorReport" 404, "Registrat ionReport" 405, "DefectReport" 406, "BarcodeReport" 407*a* and 407*b*. Each verification result is described in a corresponding tag.

The tag, "ColorReport" 404, is a print quality verification item related to differences in tint. The tint of a portion in an image of a print product is measured with a colorimeter or the like, a difference from a reference tint is calculated, and it is described whether that difference is within the criteria of quality requirements. The tag, "RegistrationReport" 405, is a print quality verification item related to a print registration error in a sheet. Lengths by which an image of a print product shifts in a vertical and/or horizontal direction with respect to a sheet or images of a print product shift between the front and back of a sheet are measured, and whether that difference is within the criteria of quality requirements is described. The tag, "DefectReport" 406, is a print quality verification item related to image defects present in printing; if there is a defective image in an image of a print product, the size thereof is measured, and it is described whether the size of that defective image is within the criteria of quality requirements. The tags, "BarcodeReport" 407*a* and 407*b*, are print quality verification items related to a one-dimensional barcode or a two-dimensional code (hereinafter referred to as a barcode), and it is described whether the print quality of the barcode is within the criteria of quality requirements.

Note that, in the tag numerals, "a" and "b" at the end of the numerals make a pair, where "a" means a start and "b" means an end. When a numeral does not have an "a" or "b", it means that a start to an end of that tag is included. Also, " . . . " between < > and </> such as in tag 404 indicates that a value may be entered therebetween. Also, "Num" indicates that a numerical value is to be entered.

FIG. 4A is a diagram illustrating an example of PQX data for a one-dimensional barcode such as JAN.

A barcode verification result is described within "BarcodeReport" 407*a* and 407*b*. For a one-dimensional barcode, it is described within tags, "Barcode1DEntry" 424*a* and 424*b*, further therein. "Codewords" 427 describes a text string that could be decoded by reading a barcode. "ISO1DVerification" 428*a* and 428*b* describe the verification results of various verification items in a barcode verification described below. "OverallSymbolGrade" 431 describes a grade in which the entirety of a verification of the barcode has been aggregated. "MinimumReflectance" 432 describes a grade of a difference in the minimum reflectance between the barcode and the background. "SymbolContrast" 433 describes a grade of a difference between the maximum reflectance and the minimum reflectance. "MinimumEdgeContrast" 434 describes a grade of contrast in brightness throughout the entire barcode. "Modulation" 435 describes a grade of the degree of variation in brightness of the barcode. "BarcodeDefects" 436 describes a grade of the percentage of defects where barcode is unreadable. "Decodability" 437 describes a grade of ease of decoding the barcode. "Decode" 438 describes with pass/fail whether the barcode could be decoded.

Incidentally, these verification items refer to the verification items defined in ISO 15416, which is a standard for one-dimensional barcode verification.

FIG. 4B is a diagram illustrating an example of PQX data for a two-dimensional barcode such as a QR Code®.

A barcode verification result is described within "BarcodeReport" 407*a* and 407*b*. For a two-dimensional barcode, it is described within tags, "Barcode2DEntry" 424*a* and 424*b*, further therein. "Codewords" 427 describes a text string that could be decoded by reading a barcode. "ISO2DVerification" 428*a* and 428*b* describe the verification results of various verification items in a barcode verification described below. The tags 431 to 438 included therein are common to the tags described in the one-dimensional barcode of FIG. 4A. The verification items specific to two-dimensional barcodes are as follows. "UnusedErrorCorrection" 439 describes a grade of ratio of unused barcode error correction. "CodewordYield" 440 describes a grade of interference between adjacent rows in the barcode. "GridNonuniformity" 441 describes a grade of the degree of registration error for each cell of the barcode. "AxialNonuniformity" 442 describes a grade of the degree of deformation of the barcode. "FixedPatternDamage" 443 describes a grade of the number of damages in a fixed pattern of the barcode.

Incidentally, these verification items refer to the verification items defined in ISO 15415, which is a standard for two-dimensional barcode verification.

FIG. 6A is a diagram illustrating an example of verification result data that a certain manufacturer's barcode verification apparatus (BCC001) generated. This verification result data includes columns 601 to 619 and rows 631 to 638.

This barcode verification apparatus, in addition to displaying a verification result on a screen after executing a verification, outputs verification result data to the outside of the barcode verification apparatus so that the workflow management server 100 can read the verification result data and process it. For example, the barcode verification apparatus writes the verification result data to a USB memory or transmits the verification result data to a shared folder or a server on the network. Here, the verification result data is described as CSV (Comma Separated Value) format data (hereinafter, also referred to as CSV data).

CSV data contains parameter names and their values, which are separated by delimiters such as commas and tabs. FIG. 6A displays depicts the CSV-format data in a tabular form for easy viewing. For example, row 631 has two parameters named "TestDevice" and "Firmware", and row 632 has "BCC001" and "1.23" as their values. Row 633 has parameters with the following names. That is, there are No., Date&time, ObjectLink, CodeSymbology, Standard, ResultGrade, ASCIIValues, and MinReflect. There are also SymContrast, MinEdgeContrast, Modul, BarDefect, Decodability, and Decode. In addition, there are UnusedErrCorrect, CodewordYield, GridNonu, AxiaNonu, and FixedPatDamage.

Rows 634 to 638 (those below these are omitted because they are the same) are values of each parameter indicated in row 633. For example, row 634 is data of a verification result of the first barcode, and column 604 has "QR" as a CodeSymbology indicating a barcode type. In column 606, there is "A" as ResultGrade which is an overall assessment of the verification. Also in column 607, there is "https://cweb.abc.jp/e-support/index.html" as ASCIIValues which is a value obtained by decoding the barcode. The quality of the barcode is evaluated in five levels: "A, B, C, D, F" or "4, 3, 2, 1, 0". ResultGrade in column 606 is an overall grade and consists of a plurality of detailed verification items as indicated below.

MinReflect in column 608 is a test item that measures a difference in the minimum reflectance between the barcode and the background, and the verification result of this barcode is grade "A". SymContrast in the next column 609 is a test item that measures a difference between the maximum reflectance and the minimum reflectance, and the verification result of this barcode is grade "A". MinEdgeContrast in the next column 610 is a test item that measures a contrast in brightness throughout the entire barcode, and the verification result of this barcode is grade "A". Modul in the next column 611 is a test item that measures a degree of variation in luminance, and the verification result of this barcode is grade "A". BarDefect in the next column 612 is a test item that measures defect, and the verification result of this barcode is grade "A". Decodability in the next column 613 is a test item that measures decodability, and the verification result of this barcode is grade "A". Decode in the next column 614 is a test item that measures whether the barcode could be decoded, and the verification result of this barcode is grade "A". UnusedErrCorrect in the next column 615 is a test item that measures a ratio of unused error correction, and the verification result of this barcode is grade "A". CodewordYield in the next column 616 is a test item that measures interference between adjacent rows in the two-dimensional barcode, and the verification result of this barcode is grade "A". GridNonu in the next column 617 is a test item that measures a degree of registration error in each cell of the two-dimensional code, and the verification result of this barcode is grade "A". AxiaNonu in the next column 618 is a test item that measures a degree of deformation of the two-dimensional code, and the verification result of this barcode is grade "A". FixedPatDamage in the next column 619 is a test item that measures the number of damages in the fixed pattern, and the verification result of this barcode is grade "A".

FIG. 6B illustrates a template for a correspondence table for describing an association between PQX data parameters and CSV data parameter (element) names of FIG. 6A and the template is stored via the data management module 301. This correspondence table template of FIG. 6B includes a verification apparatus name 641 and a region 671 for storing the value thereof. Also, as PQX parameter name 642, PQX data parameters 425 to 427 and 431 to 443 illustrated in FIG. 4B are described in parameter names 651 to 666. These parameters 425 to 427 and 431 to 443 are parameters for which a value indicated by " . . . " or "Num" may be entered as described in FIGS. 4A and 4B. Specifically, there are the following parameters indicated in parameter names 651 to 666. That is, there are BarcodeSymbology, ReporterIdLink, Codewords, OverallSymbolGrade, and MinimumReflectance. There are also SymbolContrast, MinimumEdgeContrast, Modulation, BarcodeDefects, Decodability, Decode, UnusedErrorcorrection. Further, there are CodewordYield, GridNonuniformity, AxialNonuniformity, and FixedPatternDamage.

As described in FIGS. 4A and 4B, regarding "one-dimensional/two-dimensional" 643 of the PQX parameter names 642, there are PQX parameters that are common to one and two dimensional barcodes, and PQX parameters that are present only in two-dimensional barcodes. Thus, in parameters 667, it is illustrated that parameters with "one-dimensional" is common to one and two-dimensional barcodes, and parameters with "two-dimensional" are only for two-dimensional barcodes. Verification result data element names 644, 672 to 687, are for placing the parameters in row 633 of FIG. 6A. The names and arrangement order of the parameters in row 633 of FIG. 6A may vary depending on the manufacturer that manufactures the barcode verification apparatus or the type of verification apparatus. Therefore, a correspondence table is required to describe what the CSV data parameter names corresponding to the PQX parameters are. Accordingly, in order to create a correspondence table corresponding to the manufacturer or the verification apparatus, FIG. 6B has been provided as a template to be a basis therefor.

FIG. 6C illustrates part way through a creation of a correspondence table for a barcode verification apparatus based on a template of FIG. 6B. Therefore, the same reference numbers are used to indicate the points common to FIG. 6B. Here, in the region 671, "BCC001" is described as the name of the verification apparatus. Furthermore, in the parameter name 651, "CodeSymbology" is described as an element name 672 of verification result data for CSV data corresponding to BarcodeSymbology which is a PQX parameter.

FIG. 6D illustrates a state in which the creation of the correspondence table for the barcode verification apparatus has advanced further and the correspondence between all the PQX parameters and the verification result data element names of the CSV data has been completed. This completed state is called a correspondence table. Using this correspondence table and the verification result data of the barcode verification apparatus in FIG. 6A, the correspondence between the PQX parameters, CSV data parameter names, and each verification result data can be specified. This specification method will be described later. The data of PQX parameters 425 to 427 and 431 to 443 illustrated in FIG. 4B are described in the verification result data element names 644, 672 to 687.

FIG. 6E is a diagram illustrating an example of converted verification result data which is created from the correspondence table of FIG. 6D and the CSV data of FIG. 6A using a method described later and in which the verification result values of the respective PQX parameters are displayed in CSV format data. Incidentally, in FIG. 6E, it is illustrated in a table form for easy viewing. The rows of this table indicate the PQX parameters and the columns indicate the verification result values of each and every barcode inspected.

FIG. 6F is a diagram illustrating an example of a table listing names of standards for a one-dimensional barcode and a two-dimensional barcode and examples of barcode types.

For example, for one-dimensional barcodes, it is described that the name of standard therefor is "ISO 15416", and barcode types are JAN, EAN, and the like. Using this table, it can be determined that, if the CSV data reads ISO 15416, a barcode is a one-dimensional barcode, and if the CSV data reads QR, a barcode is a two-dimensional barcode.

FIGS. 7A to 7D are diagrams illustrating examples of PQX data in which the converted verification result data of FIG. 6E is indicated in a PQX format.

FIGS. 7A to 7D correspond to the verification result data illustrated in columns 1 to 4 of FIG. 6E.

Figure 5A:
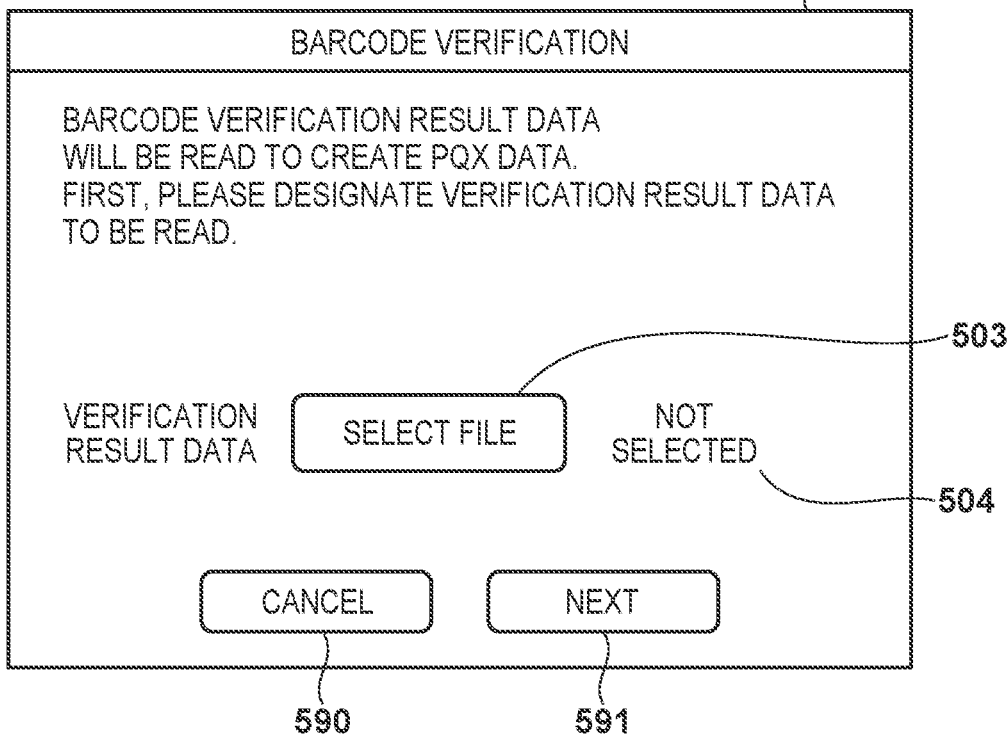
FIG. 5AA and FIG. 5AB are diagrams illustrating examples of a screen for reading CSV data of a verification result that a barcode verification apparatus according to the embodiment generated into the workflow management server.
Figure 5A:
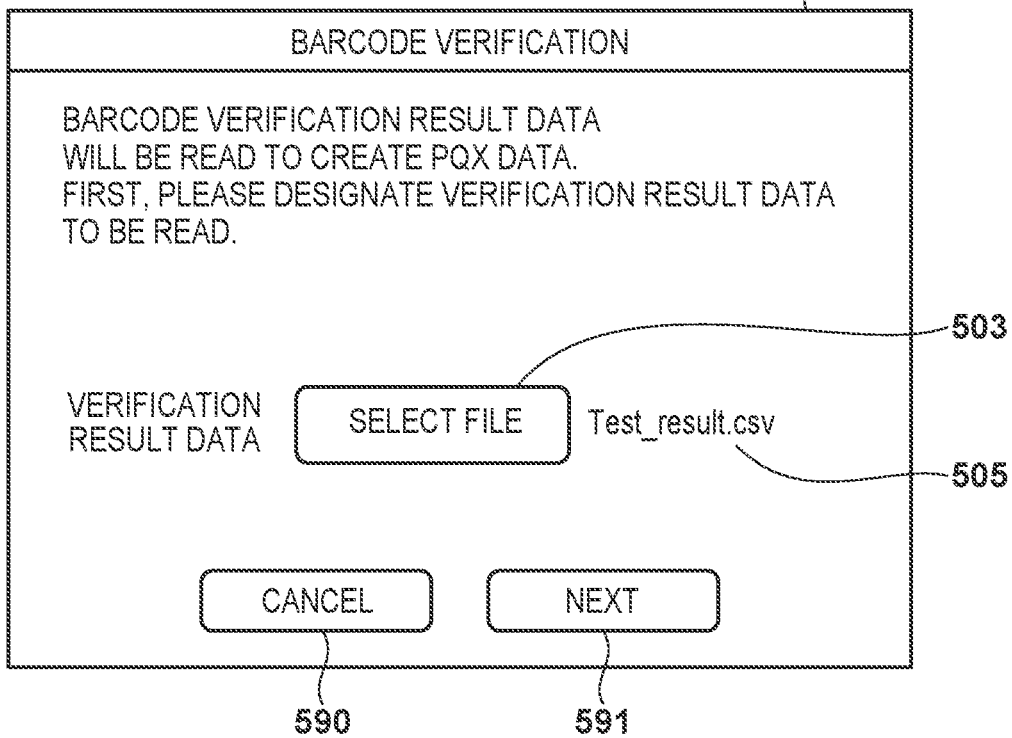
Figure 5C:
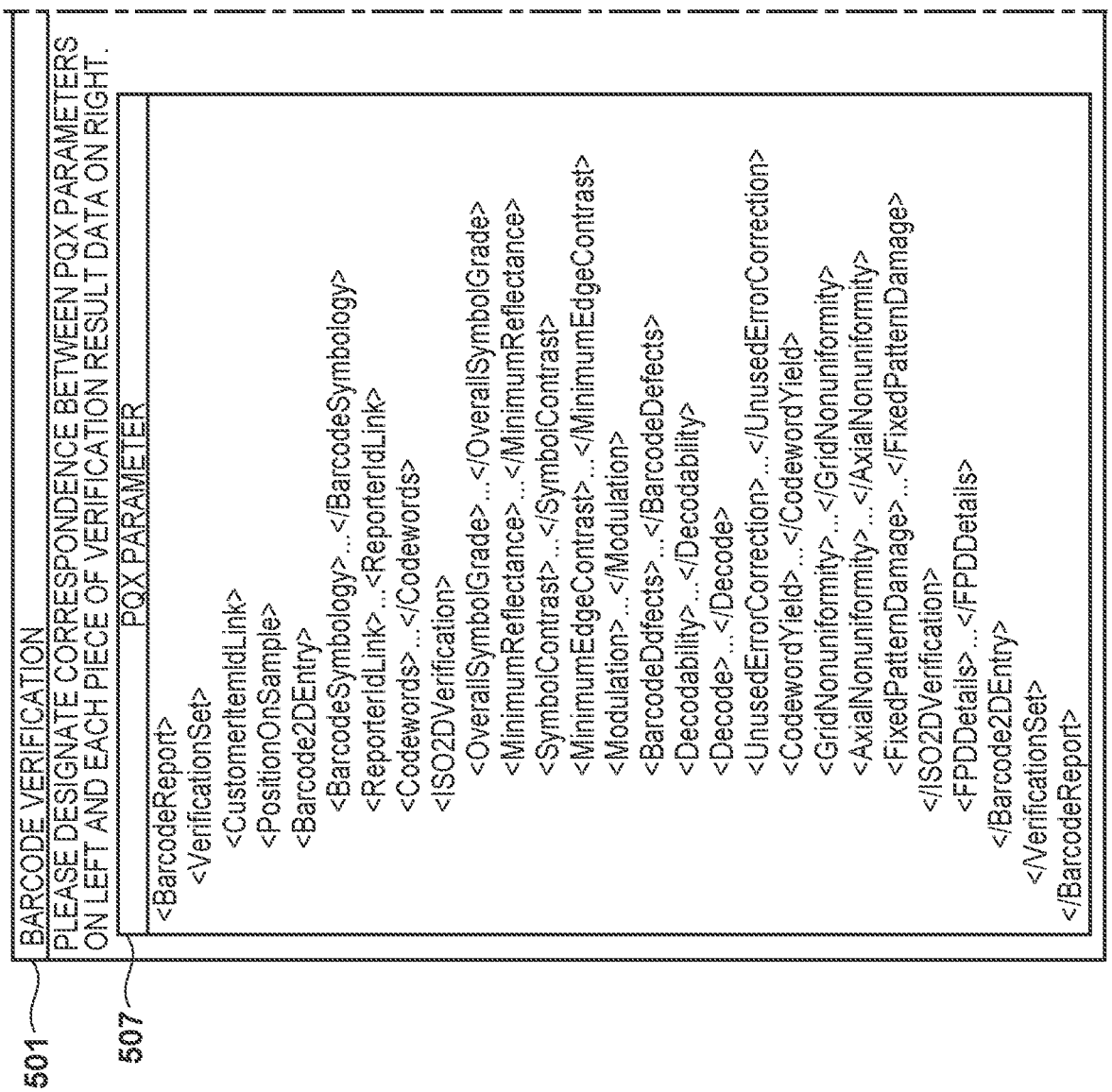
FIG. 5CA and FIG. 5CB are diagrams illustrating examples of a screen for designating a correspondence between PQX data parameters and barcode verification result data that the workflow management server according to the embodiment displays.

FIG. 5AA, FIG. 5AB, FIG. 5BA, FIG. 5BB, and FIGS. 5CA, 5CB to 5F are diagrams illustrating specific examples of screens for inputting verification results displayed on the workflow management server 100 according to the embodiment. These screens for inputting verification results are realized by the CPU 201 deploying and executing programs stored in the ROM 202 or the HDD 204 into the RAM 203.

FIG. 5AA is a diagram illustrating an example of a screen for reading CSV data of a verification result that a barcode verification apparatus (the off-line verification apparatus 130) according to the embodiment generated into the workflow management server 100.

In a screen 501, it is instructed to designate CSV data, which is verification result data to be read. Here, the user designates CSV data in a USB memory or CSV data in a shared folder on the network by pressing a "select file" button 503. A typical method for realizing this is a method of opening a file on a PC, smartphone, or the like, such as Windows™ OS. When CSV data is designated with the "select file" button 503, a file name 505 of the selected CSV data is displayed as illustrated in FIG. 5AB instead of "not selected" 504 of the screen 501 in FIG. 5AA. Here, it can be seen that the file "Test result.csv" has already been selected. Further, in FIG. 5AB, since the file name is displayed, the quality checker can also know whether or not the file is correct, and if it is incorrect, the file can be reselected by pressing the "select file" button 503 again. When CSV data is selected, the "next" button 591 is pressed to proceed to the next setting screen. Meanwhile, when it is desired to end the input of the barcode verification itself, a "cancel" button 590 is pressed.

FIG. 5BA illustrates an example of a screen that is displayed when the selected CSV data is read and as a result of determining whether a correspondence table (FIG. 6D) for the verification apparatus that generated that data already exists, it is determined that the table does not exist. In FIG. 5BA, a message "No correspondence. Create correspondence?" is displayed, asking the quality checker whether to create a new correspondence table for the read CSV data. When creating a correspondence table, the user presses the "next" button 591, if not, the user presses a "cancel" button 592, the process ends.

FIG. 5BB illustrates an example of a screen that is displayed when the selected CSV data is read and the correspondence table (FIG. 6D) for the verification apparatus that generated that data already exists. Here, a found correspondence table 506 is displayed so that the quality checker can confirm it. Here, when the quality checker determines that it is correct, he/she presses an "OK" button 595, and when he/she determines that it is incorrect, he/she presses the "cancel" button 594. This FIG. 5BB illustrates an example in which the correspondence table illustrated in FIG. 6D is displayed. Needless to say, a magnification/reduction function and a scroll function may be provided so that the details of the correspondence table can be confirmed.

FIGS. 5CA and 5CB are diagrams illustrating examples of a screen for designating a correspondence between PQX parameters and barcode verification result data that the workflow management server 100 according to the embodiment displays.

The screen 501 has a region 507 (FIG. 5CA) for displaying the PQX parameters and a region 508 (FIG. 5CB) for displaying the verification result data. In this screen 501, the quality checker is prompted to designate the correspondence between the PQX parameters of the region 507 and the barcode verification result data of the region 508. Here, to start designation, the quality checker presses a "start" button 596, and to end designation, the quality checker presses an "end" button 597. Incidentally, as for the method of displaying the PQX parameters, a PQX format in the illustrated XML, format may be displayed, or a list format in which parameters are simply enumerated or the like may be used. Although not illustrated, in order to make the meaning of the PQX parameters easier to understand, each parameter may be such that when a cursor directed by a pointing device overlaps a parameter, an explanation of that parameter is displayed.

FIGS. 5DA and 5DB are diagrams illustrating examples of a screen displayed when the "start" button 596 has been pressed in FIG. 5CB.

In this screen 501, buttons 521 to 536 (FIG. 5DA) by which each parameter of the PQX data in the region 507 can be individually selected and buttons 541 to 559 (FIG. 5DB) by which item names of the barcode verification result data in the region 508 can be individually selected are displayed.

For example, the button 521 in the region 507 is a button for selecting BarcodeSymbology, which is a PQX parameter. The button 544 in the region 508 is a button for selecting CodeSymbology of the verification result data. Here, in order to designate the correspondence between a PQX parameter and an item name of the verification result data, one of the buttons 521 to 536 of the PQX parameters in the region 507 is selected. Then, one of the buttons 541 to 559 of the item names of the verification result data in the region 508 may be selected. For example, a case where after selecting the button 521, the button 544 has been selected will be described with reference to FIG. 5E.

Figure 5E:
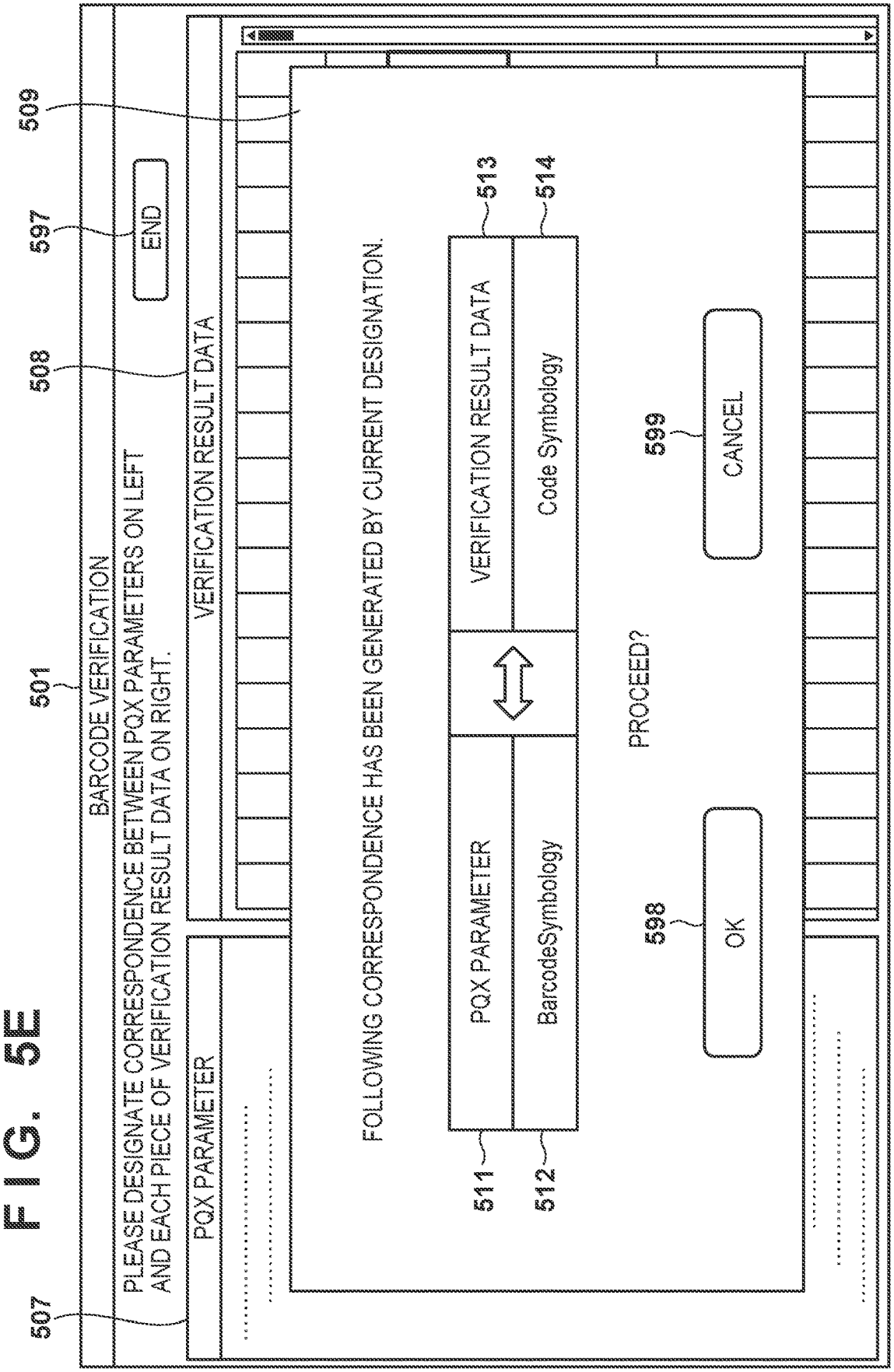
FIG. 5E is a diagram illustrating an example of a screen displayed when a button 544 of an item name of the verification result data is selected after a button 521 of a PQX parameter in FIGS. 5DA and 5DB has been selected.

FIG. 5E illustrates an example of a screen displayed when the button 544 of an item name of the verification result data in the region 508 is selected after the button 521 of a PQX parameter in the region 507 has been selected. As a result, a correspondence table for the PQX parameter 511 and the verification result data 513 is displayed on a pop-up screen 509. Then, "BarcodeSymbology" is displayed in an area 512, and "CodeSymbology" is displayed in an area 514. Here, "BarcodeSymbology" of the area 512 corresponds to the button 521 of the region 507 in FIG. 5DA, and "CodeSymbology" of the area 512 corresponds to the button 544 of the region 508 in FIG. 5DB.

The quality checker confirms whether this correspondence is correct and presses an "OK" button 598 if it is correct and presses a "cancel" button 599 if it is not correct. When the "cancel" button 599 is pressed, the screen changes from the screen of FIG. 5E to the screen 501 of FIGS. 5DA and 5DB, so the quality checker reselects a correspondence on the screen 501 of FIGS. 5DA and 5DB. If it is OK, the correspondence between the PQX parameter and the verification result data will be decided.

Figure 5F:
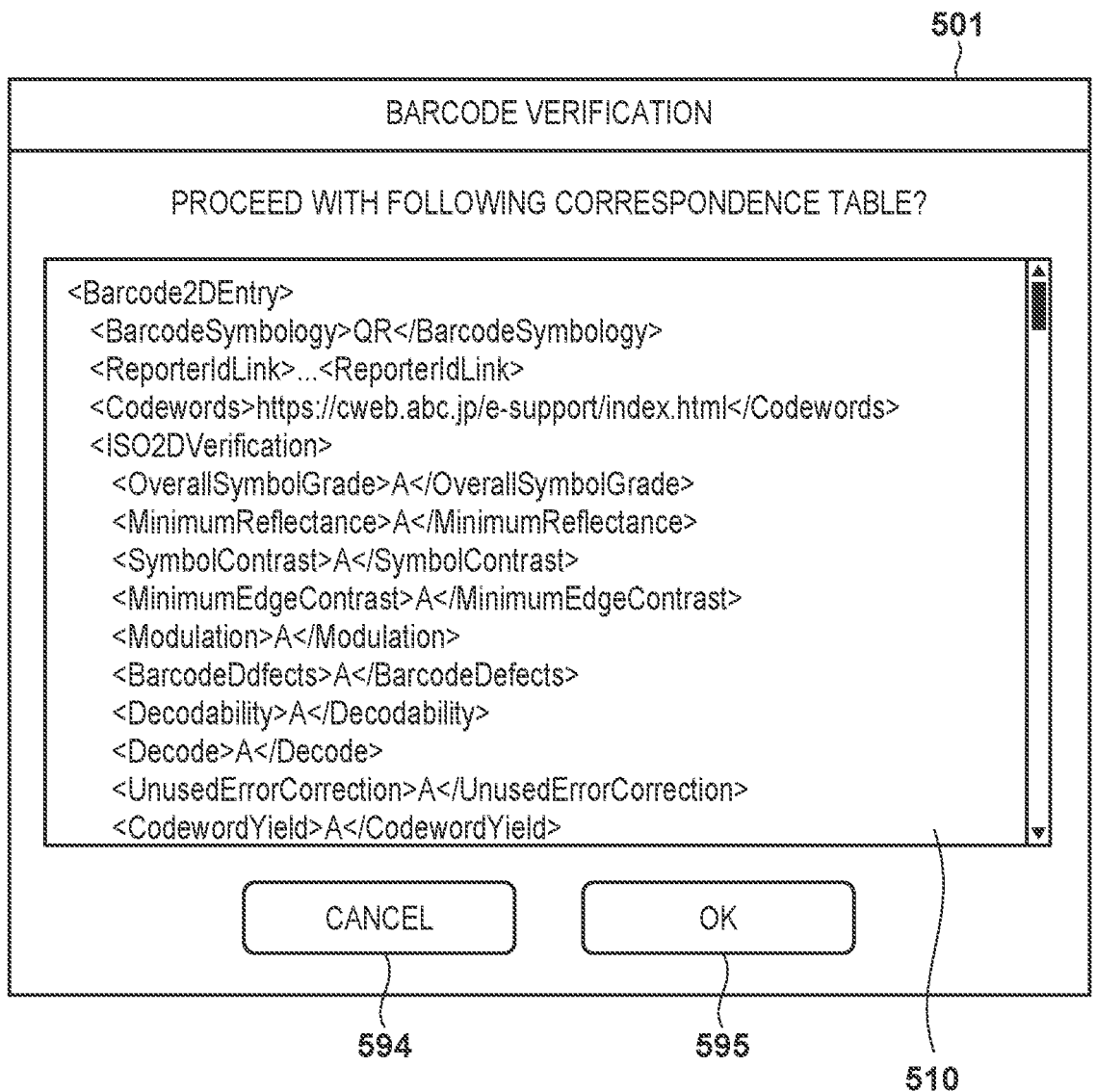
FIG. 5F is a diagram illustrating an example of a screen displaying PQX data generated in the end in the embodiment.

FIG. 5F is a diagram illustrating an example of a screen displaying PQX data generated in the end in the embodiment.

Here, generated PQX data is displayed in a display field 510 so that the quality checker can confirm it. Here, the quality checker presses an "OK" button 595 when he/she determines that the PQX data generated in the end is correct, and a "cancel" button 594 when he/she determines that the PQX data generated in the end is incorrect.

Figure 8B:
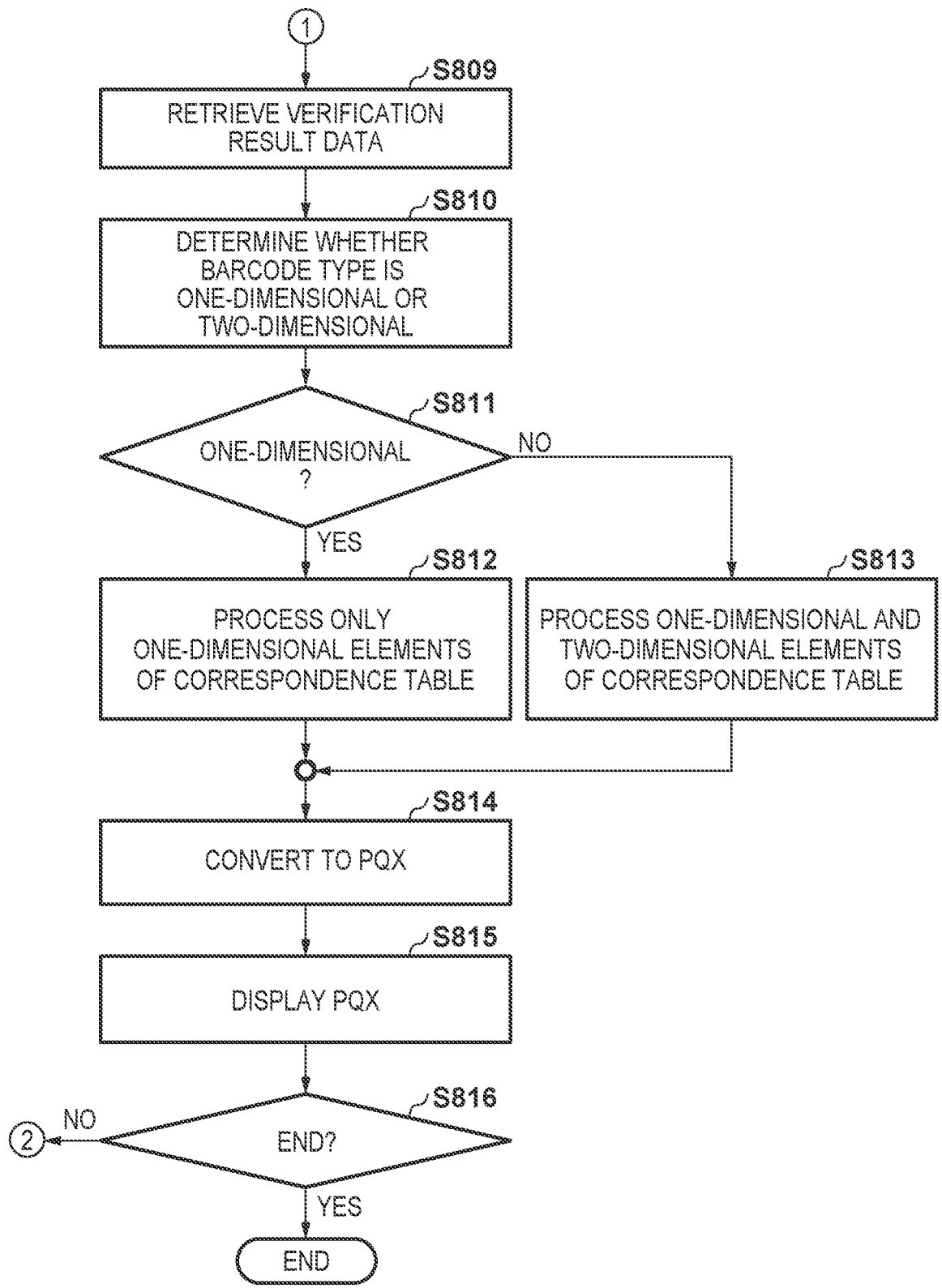

FIGS. 8A and 8B are flowcharts describing processing of the workflow management server 100 according to the embodiment. The processing described in the flowcharts is realized by the CPU 201 deploying and executing programs stored in the ROM 202 or the HDD 204 into the RAM 203. This processing is started by starting the processing of a barcode verification result in the workflow management server 100 in step S800; incidentally, in this processing, the CPU 201 primarily functions as the supervising control module 302.

In step S801, the CPU 201 instructs the screen display module 305 to display an input screen as illustrated in FIG. 5AA, for example. Next, in step S802, the CPU 201 determines whether the verification result data (CSV data) of the verification result generated by the barcode verification apparatus has been designated by the quality checker as described in FIG. 5AA. When it is determined that the verification result data is designated here, the processing transitions to step S803 and repeats step S802 until the verification result data is designated. In step S803, CPU 201 reads the verification result data of the barcode from the USB memory or the shared folder on the network through the USB memory or the communication module 310, and stores the CSV data through data management module 301. Next, the processing proceeds to step S804, and the CPU 201 analyzes the CSV data and extracts the manufacturer's apparatus name (identification information) of the barcode verification apparatus. Next, the processing proceeds to step S805, and the CPU 201 searches for the database that stores a correspondence table that corresponds to the manufacturer's apparatus name. Then, in step S806, the CPU 201 determines whether or not a correspondence table that corresponds to the manufacturer's apparatus name extracted in step S804 exists among the correspondence tables stored in the database, and if it is determined that it exists, the processing transitions to step S807, and if it is determined that it does not exist, the processing transitions to step S821. Note that this database is stored, for example, in the HDD 204.

First, referring to step S821 to step S829, processing for creating a new correspondence table when there is no correspondence table for the read verification result data among the data stored in the database will be described.

In step S821, the CPU 201 retrieves a stored correspondence table template (FIG. 6B) and copies it. Next, the processing proceeds to step S822, and the CPU 201 simultaneously displays the PQX parameters generated by extracting the barcode parameters from the two-dimensional PQX data of FIG. 4B and the CSV data of the barcode verification result read in the beginning. Here, for example, a correspondence screen as illustrated in FIGS. 5CA and 5CB is displayed. As described with reference to FIGS. 5CA and 5CB, here, the CPU 201 determines whether the designation of a correspondence has been started by the quality checker. That is, the processing transitions to step S824 when the "start" button 596 is pressed, and the processing repeats step S823 until the "start" button 596 is pressed.

Next, in step S824, the CPU 201 instructs the screen display module 305 to display a plurality of selection items in the region 507 of the PQX parameters and the region 508 of the verification result data of FIG. 5CB and displays a correspondence designation screen as illustrated in FIGS. 5DA and 5DB, for example. Here, the CPU 201 knows that the parameters 425 to 427 and 431 to 443 of FIG. 4B are the PQX parameters that should be displayed as selection items in the region 507 of the PQX parameters. Therefore, they are displayed as buttons 521 to 536. In addition, in the region 508 of the verification result data, the CPU 201 analyzes the read verification result data and can determine that the first row among the rows in which a large number of values are described in units of rows corresponds to the verification item names. Thus, the CPU 201 searches for such a row and displays the verification item names as buttons 541 to 599 so that they can be selected on the screen.

Incidentally, depending on the verification apparatus, items described in one row may be change in order, such as a case where the button 541 "No.", the parameter 522, "Date&time", and the like are omitted, for example. Further, if all of the verified barcodes are one-dimensional, the PQX parameters will be fewer as described in FIG. 4A, and so, the number of verification items described in a row will also be fewer in the verification result data. In light of these, it can be determined that the first row among the rows in which a large number of values are described in units of rows corresponds to the verification item names. Incidentally, in the region 508 of the verification result data, configuration may be taken so as to enable designation via the input receiving module 306 to enable locations other than the buttons 541 to 599 to be selected.

Next, in step S825, the CPU 201 determines whether a correspondence designation operation has been completed by the quality checker. That is, here, when the "end" button 597 is pressed, it is determined that the operation is complete and the processing transitions to step S809 (FIG. 8B), and when the "end" button 597 is not pressed, the processing transitions to step S826.

Next, in step S826, the CPU 201 displays the correspondence designation screen 501 of FIGS. 5DA and 5DB, and then determines whether a pair of correspondence selection items, where one is from the region 507 of the PQX parameters and one is from the regions 508 of the verification result data, have been selected by the quality checker. If no selection is made here, the processing transitions to step S825. By repeating step S825 and step S826 in this way, it is awaited for the quality checker to either press the "end" button 597 or select a pair of selection items.

When it is determined that a selection has been made in step S826, the processing proceeds to step S827, and the CPU 201 instructs the screen display module 305 to display the pop-up screen 509 as illustrated in FIG. 5E, for example. Here, the pop-up screen 509 in which the value of the selection item in the PQX parameter portion 507 and the value of the selection item in the verification result data portion 508 selected by the quality checker in the previous step are displayed in the area 512 and the area 514, respectively, is displayed. In the example of FIG. 5E, "BarcodeSymbology" is displayed in the area 512, and "CodeSymbology" is displayed in the area 514.

Next, the processing proceeds to step S828, and the CPU 201 determines whether the "OK" button 598 of the pop-up screen 509 of FIG. 5E has been selected by the quality checker. When the "OK" button 598 is selected, the processing transitions to step S829, and when the "cancel" button 599 is selected, the processing transitions to step S824, the selection items are displayed again, and the selection redone. In step S829, the CPU 201 registers the correspondence displayed on the pop-up screen 509 in the correspondence table created in step S821.

The processing of step S829 is explained in detail. The CPU 201 functioning as the supervising control module 302 determines whether the PQX parameter name in the area 512 corresponds to any of the PQX parameter names 651 to 666 in the correspondence table of FIG. 6B and FIG. 6C. Then, the CPU 201 enters the value of the area 514 in one of the verification result data element name fields 672 to 687 corresponding to the PQX parameter thereof. FIG. 6C illustrates a correspondence table in which "CodeSymbology" is registered in the field 672 which is the verification result data element name corresponding to a PQX parameter name 651, "BarcodeSymbology". Further, in step S829, the CPU 201 closes the pop-up screen 509 and transitions to step S824 by hiding the selection items selected in step S826 so as to be unselectable.

By repeating step S824 to step S829 in this way, the verification result data element name corresponding to each PQX parameters is entered in the correspondence table. An example of a completed result is illustrated in FIG. 6D.

As described above, even if there is no correspondence table corresponding to the barcode verification apparatus, a correspondence table corresponding to a new barcode verification apparatus can be created.

Next, in step S806, a process when there is a correspondence table corresponding to the barcode verification apparatus will be described.

In step S807, the CPU 201 retrieves the found correspondence table from the database, instructs the screen display module 305, for example, as illustrated in FIG. 5BB, to display the screen of the verification result. In the screen of FIG. 5BB, the found correspondence table 506 is displayed so that the quality checker can confirm it. Then, in step S808, the CPU 201 determines whether or not the "OK" button 595 has been pressed by the quality checker, and when the "OK" button 595 indicating that the search result is correct is pressed, the processing transitions to step S809. Meanwhile, when the "cancel" button 594 is pressed, the processing transitions to step S807, and the database is searched again, another found correspondence table is retrieved, and an verification result input screen as illustrated in FIG. 5BB, for example, is displayed.

Next, in step S809, the CPU 201 reads either the correspondence table created in the above step S821 to step S829 or the correspondence table found in step s805 and then retrieved in step S807 and the verification result data (CSV data). Next, the processing proceeds to step S810, and the CPU 201 analyzes the verification result data read in step S803 to determine whether the barcode type is one or two-dimensional. At this time, the CPU 201 retrieves a table for determining whether the barcode type is one or two-dimensional illustrated in FIG. 6F and performs determination by referring to the table. For example, a row 634 of verification result data illustrated in FIG. 6A is analyzed, and a search for a character string such as "QR" or "ISO 15415" therein is performed, and a comparison with a one-dimensional/two-dimensional table of FIG. 6F is performed to determine whether the barcode type is one-dimensional or two-dimensional. As a result of the determination in step S811, the processing advances to step S812 when one-dimensional and the processing transitions to step S813 when two-dimensional.

In step S812, the CPU 201 processes only the one-dimensional elements of the correspondence table of FIG. 6D and advances to step S814. Meanwhile, in step S813, the CPU 201 processes both one and two-dimensional elements of the correspondence table of FIG. 6D and advances to step S814.

As explained with the parameters 667 of FIG. 6B to FIG. 6D, there are PQX parameters common to one and two-dimensional barcodes and PQX parameters that are required only in two-dimensional barcodes. In step S812, the parameters described as one-dimensional in the correspondence table parameter 667 in FIG. 6D are processed for both the parameters described as one-dimensional and two-dimensional in the correspondence table parameter 667 in FIG. 6D are processed in step S813. Further, the CPU 201 compares the verification result data element names in the fields 672 to 687 of the correspondence table with the parameter names in row 633 of the verification result data in FIG. 6A and extracts the corresponding values in row 634 if there are matches. This is processed for all verification result data element names in the fields 672 to 687. As a result, for the verification result data of row 634, the correspondence between the PQX parameters of the parameter names 651 to 666 in FIG. 6D and the verification result data values is created. This is created in the form of converted verification result data described in FIG. 6E. The second column of the converted verification result data of FIG. 6E is created based on row 634, and the third column is created based on row 635.

Next, in step S814, the CPU 201 instructs the PQX generation module 309 to convert the converted verification result data created in the previous step into a PQX format. An example of PQX data thus converted into a PQX format by the PQX generation module 309 is illustrated in FIG. 7A to FIG. 7D.

Next, the processing proceeds to step S815, and the CPU 201 instructs the screen display module 305 to display the created PQX data as in FIG. 5F, for example, so that the quality checker can confirm it. The processing proceeds to step S816, and the CPU 201 determines whether or not the "OK" button 595 or the "cancel" button 594 of the screen of FIG. 5F has been pressed via the input receiving module 306. When the "cancel" button 594 is pressed, the processing transitions to step S809 to redo, and when the "OK" button 595 is pressed, the processing ends.

As described above, in the commercial printing system according to the embodiment, a screen for inputting an off-line verification result is provided, enabling the quality checker to easily input the verification result, and from that input, PQX data can be easily generated.

Incidentally, the verification result data of FIG. 6A may be in the form of an XML or the like in addition to CSV. Usually, an XML format is expressed as <NAME> when the item name is NAME and <NAME> VALUE</NAME> when the item value is VALUE. Therefore, if the verification result data is in an XML format, the process of extracting verification item names by analyzing the verification result data in a CSV format described in step S824 may be performed by extracting <NAME>.

In addition, there may be cases where this XML-format verification result data describes an XML tag that consolidates multiple verification result items corresponding to row 633 of FIG. 6A. In other words, <TestResult> <NAME1>VALUE<NAME1><NAME2>VALUE <NAME2>omit</TestResult> may be used to describe several items, such as NAME1 and NAME2, in a group. In such cases, it can be determined that the tags nested in TestResult are the verification item names.

Note that the CPU 201 functions as the supervising control module 302 and searches for the correspondence table in the storage via the data management module 301 in step S805. At this time, the CPU 201 may query the order system server 110 or another service server on the Internet through the communication module 310 and download the correspondence tables of each manufacturer's various verification apparatuses and store them through the data management module 301. The service server is a server operated on the Internet by a manufacturer or an operating company that provides the commercial printing system, and the supervising control module 302 knows the FQDN, IP address, and the like of the server and can access the server. The order system server 110 and the service server periodically monitor whether the correspondence tables of the barcode verification apparatuses are being newly created or updated and store the latest correspondence tables. Thus, the supervising control module 302 periodically obtains the latest correspondence tables from these servers and stores them through the data management module 301. By this, it becomes possible to use the correspondence table of a barcode verification apparatus that has not been handled before without having the user create a correspondence table as described in step S821 to step S829.

Note that depending on the barcode verification apparatus, in anticipation of the correspondence to the PQX, it is also conceivable to prepare a correspondence table for the verification result data element names and the PQX parameters in the format of the verification result data generated by that verification apparatus. For example, the barcode verification apparatus outputs verification result data and a correspondence table together in a single file using a zip file or the like to a USB memory or a shared folder. When the supervising control module 302 of the workflow management server 100 reads the verification result data from a USB memory or a shared folder in step S803, the correspondence table is also read at the same time. In such a case, when determining whether there is a correspondence table in step S805, the processing transitions to step S807 since there is a correspondence table that was read at the same time, and then subsequent processing is performed using that correspondence table.

Alternatively, the barcode verification apparatus outputs verification result data as described above but transmits a correspondence table separately to the workflow management server 100, the order system server 110, or the service server. The transmitted correspondence table is regularly obtained by the supervising control module 302 as described above from these various servers and is stored through the data management module 301. In such a case, when determining whether there is a correspondence table in step S805, the processing transition to step S807 since there is a correspondence table obtained from a server, and then subsequent flow is performed using that correspondence table.

Incidentally, these correspondence tables that the supervising control module 302 obtains from an external unit may be described in an XML, format. That is, the PQX parameter names 642 in FIG. 6D may be tags, and the number of dimensions of the barcode, "one-dimensional/two-dimensional" 643, and the verification result data element names 644 may be values. For example, the relationship described in step S829 are described as <Barcode Symbology><Dimension>1</Dimension><Value>Code Symbology</Value></BarcodeSymbology>. In this way, the correspondence table for the PQX parameter names 642; the number of dimensions of the barcode, "one-dimensional/two-dimensional" 643; and the verification result data element names 644 can be described in an XML format.

Furthermore, it is possible to execute the process of the supervising control module 302 described in step S812 and step S813 using this correspondence table of an XML format. Further, in this process, it is simpler to generate the converted verification result data of FIG. 6E in an XML. Then, the PQX data illustrated in FIG. 7A to FIG. 7D can be generated simply.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-16888, filed Feb. 4, 2021, which is hereby incorporated by reference herein in its entirety.

What is claimed is:

1. An information processing system performs processing of a print job including a quality requirement of a quality verification of a print product, the system comprising:
   a printer configured to execute the print job and generate a print product;
   a verifier configured to verify the print product and create verification result data; and
   an information processor configured to create, from the verification result data created in the verifier, a description document of a predetermined format in which verification result data of a corresponding print product is described, wherein the information processor comprises:
a controller having one or more processors which executes instructions stored in one or more memories being configured to:
input the verification result data created in the verifier;
search a correspondence table corresponding to the verifier that created the verification result data in which each parameter of the description document and an element of the input verification result data are associated;
using the searched correspondence table, convert a value of each element of the input verification result data to a value of a corresponding parameter of the description document; and
generate the description document of the predetermined format including the converted value of each parameter.

2. The information processing system according to claim 1, wherein the controller is further configured to:
store, in a storage, identification information of the verifier and the correspondence table corresponding to the identification information, and
wherein, in the converting of the value of each element of the input verification result data, in a case where the storage stores the correspondence table corresponding to the identification information of the verifier, the controller converts the value of each element of the verification result data to the value of each parameter of the description document using the correspondence table corresponding to the verifier.

3. The information processing system according to claim 2, wherein the controller is further configured to:
in a case where the storage does not store the correspondence table corresponding to the identification information of the verifier, create a correspondence table using a template of the correspondence table.

4. The information processing system according to claim 3, wherein the controller is further configured to:
in creating the correspondence table, display a screen including each parameter of the description document and the element of the verification result data; and
accept a designation of correspondence between a parameter of the description document and the element of the verification result data via the screen,
wherein the controller creates the correspondence table corresponding to the verifier based on the accepted designation of the correspondence.

5. The information processing system according to claim 1, wherein the verifier is a barcode verification apparatus, and
wherein, in converting of the value of each element of the input verification result data, the controller determines whether a barcode type of the verification result data is one-dimensional or two-dimensional and converts the value of each element of the verification result data to a value of a corresponding parameter of the description document of a format that accords with a result of that determination.

6. The information processing system according to claim 5, wherein in a case where the barcode type is two-dimensional, the description document includes another parameter in addition to a parameter for a one-dimensional barcode type.

7. The information processing system according to claim 1, wherein the predetermined format is a PQX (Print Quality eXchange) format.

8. An information processing apparatus operable to create, from verification result data of a print product generated by executing a print job including a quality requirement of a quality verification of a print product, a description document of a predetermined format in which verification result data of that print product is described, the apparatus comprising:
a controller having one or more processors which executes instructions stored in one or more memories being configured to:
input the verification result data of the print product created in a verifier;
search a correspondence table corresponding to the verifier that created the verification result data in which each parameter of the description document and an element of the input verification result data are associated;
using the searched correspondence table, convert a value of each element of the input verification result data to a value of a corresponding parameter of the description document; and
create the description document of the predetermined format including the converted value of each parameter.

9. The information processing system according to claim 8, wherein the controller is further configured to:
store, in a storage, identification information of the verifier and the correspondence table corresponding to the identification information,
wherein, in converting of the value of each element of the input verification result data, in a case where the storage stores the correspondence table corresponding to the identification information of the, the controller converts the value of each element of the verification result data to the value of a respective parameter of the description document using the correspondence table corresponding to the verifier.

10. The information processing apparatus according to claim 9, wherein the controller is further configured to:
in a case where the storage does not store the correspondence table corresponding to the identification information of the verifier, generate a correspondence table using a template of the correspondence table.

11. The information processing apparatus according to claim 10, wherein the controller is further configured to:
in the generating of the correspondence table, display a screen including each parameter of the description document and the element of the verification result data; and
accept a designation of correspondence between a parameter of the description document and the element of the verification result data via the screen,
wherein the controller generates the correspondence table corresponding to the verifier based on the correspondence.

12. The information processing apparatus according to claim 8, wherein the verifier is a barcode, and
wherein, in converting of the value of each element of the input verification result data, the controller determines whether a barcode type of the verification result data is one-dimensional or two-dimensional and converts the value of each element of the verification result data to a value of a corresponding parameter of the description document of a format that accords with a result of that determination.

13. The information processing apparatus according to claim 12, wherein in a case where the barcode type is two-dimensional, the description document includes a parameter in addition to a parameter of a case where the barcode type is one-dimensional.

14. The information processing apparatus according to claim 8, wherein the predetermined format is a PQX (Print Quality eXchange) format.

15. A method of controlling an information processing apparatus operable to create, from verification result data of a print product generated by executing a print job including a quality requirement of a quality verification of a print product, a description document of a predetermined format in which verification result data of that print product is described, the method comprising:

inputting the verification result data of the print product created in a verifier;

searching a correspondence table corresponding to the verifier that created the verification result data in which each parameter of the description document and an element of the input verification result data are associated;

using the searched correspondence table, converting a value of each element of the input verification result data to a value of a corresponding parameter of the description document; and creating the description document of the predetermined format including the converted value of each parameter.

16. A non-transitory computer-readable storage medium storing a program for causing a processor to execute a method of controlling an information processing apparatus operable to create, from verification result data of a print product generated by executing a print job including a quality requirement of a quality verification of a print product, a description document of a predetermined format in which verification result data of that print product is described, the method comprising:

inputting the verification result data of the print product created in a verifier;

searching a correspondence table corresponding to the verifier that created the verification result data in which each parameter of the description document and an element of the input verification result data are associated;

using the searched correspondence table, converting a value of each element of the input verification result data to a value of a corresponding parameter of the description document; and creating the description document of the predetermined format including the converted value of each parameter converted.

* * * * *